United States Patent
Fay, II

(10) Patent No.: US 11,097,775 B2
(45) Date of Patent: Aug. 24, 2021

(54) METHOD AND CONTROL SYSTEM FOR ESTABLISHING A STEERING ANGLE OF A STEERABLE CASTER

(71) Applicant: CNH Industrial America LLC, New Holland, PA (US)

(72) Inventor: Jeffrey Brown Fay, II, Oxford, PA (US)

(73) Assignee: CNH Industrial America LLC, New Holland, PA (US)

( * ) Notice: Subject to any disclaimer, the term of this patent is extended or adjusted under 35 U.S.C. 154(b) by 65 days.

(21) Appl. No.: 16/713,115

(22) Filed: Dec. 13, 2019

(65) Prior Publication Data

US 2020/0164917 A1 May 28, 2020

Related U.S. Application Data

(63) Continuation-in-part of application No. 16/200,324, filed on Nov. 26, 2018.

(51) Int. Cl.
  *B62D 6/08* (2006.01)
  *A01B 69/00* (2006.01)
  *B62D 5/06* (2006.01)
  *B62D 9/00* (2006.01)

(52) U.S. Cl.
  CPC .............. *B62D 6/08* (2013.01); *A01B 69/007* (2013.01); *B62D 5/06* (2013.01); *B62D 9/00* (2013.01)

(58) Field of Classification Search
  CPC ... B62D 6/08; B62D 6/10; B62D 5/06; B62D 5/065; B62D 7/06; B62D 7/08; B62D 9/00; B62D 9/002; B62D 7/14; B62D 7/142; A01B 69/007

USPC .................................................. 180/6.24, 6.3
See application file for complete search history.

(56) References Cited

U.S. PATENT DOCUMENTS

| | | | |
|---|---|---|---|
| 2,886,016 A | 5/1959 | Ashton | |
| 3,392,797 A | 7/1968 | Gibson et al. | |
| 3,731,758 A | 5/1973 | Hibma | |
| 7,147,241 B2 | 12/2006 | Beujot et al. | |
| 8,925,672 B2 | 1/2015 | Bebernes et al. | |
| 9,463,837 B1 | 10/2016 | Li | |
| 9,725,115 B1 * | 8/2017 | Hauser | B62D 5/0457 |
| 9,930,824 B2 | 4/2018 | Nafziger et al. | |
| 10,661,831 B2 * | 5/2020 | Rotole | B62D 5/09 |
| 2018/0093708 A1 * | 4/2018 | Soldan | B62D 7/08 |
| 2018/0186207 A1 | 7/2018 | Fay, II et al. | |

* cited by examiner

*Primary Examiner* — Ruth Ilan
*Assistant Examiner* — Hosam Shabara
(74) *Attorney, Agent, or Firm* — Peter Zacharias; Patrick Sheldrake

(57) ABSTRACT

For a vehicle having left and right powered front wheels and a rear axle having left and right casters, with at least one of the casters being steerable, the steering angle of the steerable caster is controlled when the vehicle is stationary and executing a direction orientation maneuver prior to transitioning to a turn. The rotations of the steerable caster and at least one of the left and right wheels may be autonomously adjusted using a controller. The controller rotates the steerable caster about a caster axis in a direction consistent with the direction of the turn through a steering angle proportion to the magnitude of the turn, and rotates at least one of the left and right wheels to turn the vehicle in a direction consistent with the direction of the turn and in proportion to the magnitude of the turn.

22 Claims, 28 Drawing Sheets

712 — Wherein At Least One of the Left and Right Wheels is Rotated Through an Angle Such that the Only Motion of the Left and Right Casters is Rotation About Respective Left and Right Vertical Axes Passing Through Respective Ground Contact Patches of the Left and Right Casters.

FIG. 28

714 — Rotating Both the Left and Right Wheels in Opposite Directions from One Another Consistent With the Direction of the Turn and in Proportion to the Magnitude of the Turn 716 — Wherein the Left and Right Wheels are Rotated Through Respective Angles Such that the Only Motion of the Left and Right Casters is Rotation About Respective Left and Right Vertical Axes Passing Through Respective Ground Contact Patches of the Left and Right Casters.

FIG. 29

718 — Initially Applying Equal Torque to the Left and Right Wheels to Move the Vehicle into the Turn 720 — Applying Increased Torque to the Wheel on an Outside of the Turn

Wherein the Left Wheel is Rotated Through an Angle Such that the Only Motion of the Left and Right Casters is Rotation About Respective Left and Right Vertical Axes Passing Through Respective Ground Contract Patches of the Left and Right Casters, and the Right Wheel is Rotated Through an Angle Such that the Only Motion of the Left and Right Casters is Rotation About Respective Left and Right Vertical Axes Passing Through Respective Ground Contract Patches of the Left and Right Casters

If the Direction of the Turn is Left, then also Rotating the Right Wheel so as to Propel the Vehicle Forward

716

Wherein the Left and Right Wheels are Rotated Through Respective Angles Such that the Only Motion of the Left and Right Casters is Rotation About Respective Left and Right Vertical Axes Passing Through Respective Ground Contact Patches of the Left and Right Casters.

If the Direction of the Turn is Right, then also Rotating the Left Wheel so as to Propel the Vehicle Forward

716

Wherein the Left and Right Wheels are Rotated Through Respective Angles Such that the Only Motion of the Left and Right Casters is Rotation About Respective Left and Right Vertical Axes Passing Through Respective Ground Contact Patches of the Left and Right Casters.

FIG. 34

828 —
If the Direction of the Turn is Left, then also Rotating the Left Wheel so as to Propel the Vehicle in Reverse 716 —
Wherein the Left and Right Wheels are Rotated Through Respective Angles Such that the Only Motion of the Left and Right Casters is Rotation About Respective Left and Right Vertical Axes Passing Through Respective Ground Contact Patches of the Left and Right Casters.

FIG. 36

830 —
If the Direction of the Turn is Right, then also Rotating the Right Wheel so as to Propel the Vehicle in Reverse 716 —
Wherein the Left and Right Wheels are Rotated Through Respective Angles Such that the Only Motion of the Left and Right Casters is Rotation About Respective Left and Right Vertical Axes Passing Through Respective Ground Contact Patches of the Left and Right Casters.

FIG. 37

METHOD AND CONTROL SYSTEM FOR ESTABLISHING A STEERING ANGLE OF A STEERABLE CASTER

CROSS REFERENCE TO RELATED APPLICATIONS

This application is a continuation in part of and claims priority to application Ser. No. 16/200,324, filed Nov. 26, 2018, which is hereby incorporated by reference it its entirety.

FIELD OF THE INVENTION

This invention relates to vehicles capable of both dual path and rear axle steering and control systems for effecting stationary turns.

BACKGROUND

Harvesters such as windrowers, tractors, and forage harvesters, have to operate effectively in different operational modes (e.g., normal operation mode, in-field operation mode, high-speed operation mode, or the like). Typical construction for such vehicles include front ground wheels mounted on the frame at fixed angles parallel to each other and parallel to a center line of the frame and rear ground wheels mounted on respective casters. Each front ground wheel is typically driven by a respective drive motor which allows variable speed in both the forward and reverse directions such that steering of the tractor is effected by a differential in speed between the front wheels with the rear wheels following the steering in a castering action.

Certain self-propelled vehicles, in particular agricultural equipment such as harvesters, including combines and windrowers are advantageously steered when stationary and maneuvering in preparation for a turn from one road to another, by rotating the front wheels in opposite directions relative to one another while the casters passively follow. This steering method provides enhanced mobility and even zero radius turns. However, steering the vehicle in this manner can result in either of the left and right front wheels spinning while trying to fight the castered rear wheels, or skidding the rear wheels sideways across the ground. Both of these situations may result in damaged rear axle components. In situations where the vehicle is stationary and executing a turn by rotating the front wheels in opposite directions with a passively following rear caster, it would be advantageous to employ a method and system for establishing a steering angle of a steerable caster.

SUMMARY

This invention concerns a method and control system for establishing a steering angle of a steerable caster while a vehicle is stationary. The vehicle is capable of both dual path and rear axle steering with respective left and right powered front mounted wheels and a rear axle with respective left and right casters. In one example embodiment, the method comprises:
sensing a steering command;
determining a direction of a turn corresponding to the steering command;
determining a magnitude of the turn corresponding to the steering command;
rotating the steerable caster about a caster axis in a direction consistent with the direction of the turn through a steering angle proportional to the magnitude of the turn; and
rotating at least one of the left and right wheels so as to turn the vehicle in a direction consistent with the direction of the turn and in proportion to the magnitude of the turn.

An example of the method may include steps wherein the direction of the turn is determined by a direction which the steering wheel is rotated. Another example of the method may include steps wherein the magnitude of the turn is determined by the size of an angle through which the steering wheel is rotated.

An example of the method may include steps wherein at least one of the left and right wheels is rotated through an angle such that the only motion of the left and right casters is rotation about respective left and right vertical axes passing through respective ground contact patches of the left and right casters.

An example method may further comprises rotating both the left and the right wheels in opposite directions from one another consistent with the direction of the turn and in proportion to the magnitude of the turn. A particular example of the method may include steps wherein, the left and right wheels are rotated through respective angles such that the only motion of the left and right casters is rotation about respective left and right vertical axes passing through respective ground contact patches of the left and right casters. Another particular example of the method may further comprise: initially applying equal torque to the left and right wheels to move the vehicle into the turn; and applying increased torque to the wheel on an outside of the turn.

Another example embodiment of a method according to the invention the method may comprise:
sensing a steering command;
determining a direction of a turn corresponding to the steering command;
determining a magnitude of the turn corresponding to the steering command;
wherein
if the direction of the turn is left, then:
rotating the steerable caster about a caster axis in a direction consistent with the left turn through a left steering angle proportional to the magnitude of the turn; and
rotating the left wheel so as to propel the vehicle in reverse; and wherein
if the direction of the turn is right, then:
rotating the steerable caster about a caster axis in a direction consistent with the right turn through a right steering angle proportional to the magnitude of the turn; and
rotating the right wheel so as to propel the vehicle in reverse.

An example of the method may include steps wherein:
the left wheel is rotated through an angle such that the only motion of the left and right casters is rotation about respective left and right vertical axes passing through respective ground contact patches of the left and right casters; and
the right wheel is rotated through an angle such that the only motion of the left and right casters is rotation about respective left and right vertical axes passing through respective ground contact patches of the left and right casters.

An example of the method may include steps wherein if the direction of the turn is left, then also rotating the right wheel so as to propel the vehicle forward. A particular example of the method may include steps wherein the left and right wheels are rotated through respective angles such that the only motion of the left and right casters is rotation about respective left and right vertical axes passing through respective ground contact patches of the left and right casters.

An example of the method may include steps wherein if the direction of the turn is right, then also rotating the left wheel so as to propel the vehicle forward. A particular example of the method may include steps wherein the left and right wheels are rotated through respective angles such that the only motion of the left and right casters is rotation about respective left and right vertical axes passing through respective ground contact patches of the left and right casters. In another particular example, the method may further comprise:
  initially applying equal torque to the left and right wheels to move the vehicle into the turn; and
  applying increased torque to the wheel on an outside of the turn.

Another example embodiment of a method according to the invention the method may comprise:
  sensing a steering command;
  determining a direction of a turn corresponding to the steering command;
  determining a magnitude of the turn corresponding to the steering command;
  wherein
  if the direction of the turn is left, then:
  rotating the steerable caster about a caster axis in a direction consistent with the left turn through a left steering angle proportional to the magnitude of the turn; and
  rotating the right wheel so as to propel the vehicle forward; and wherein if the direction of the turn is right, then:
  rotating the steerable caster about a caster axis in a direction consistent with the right turn through a right steering angle proportional to the magnitude of the turn; and
  rotating the left wheel so as to propel the vehicle forward.

An example of the method may include steps wherein:
  the left wheel is rotated through an angle such that the only motion of the left and right casters is rotation about respective left and right vertical axes passing through respective ground contact patches of the left and right casters; and
  the right wheel is rotated through an angle such that the only motion of the left and right casters is rotation about respective left and right vertical axes passing through respective ground contact patches of the left and right casters.

An example of the method may include steps wherein, if the direction of the turn is left, then also rotating the left wheel so as to propel the vehicle in reverse. A particular example of the method may include steps wherein the left and right wheels are rotated through respective angles such that the only motion of the left and right casters is rotation about respective left and right vertical axes passing through respective ground contact patches of the left and right casters.

An example of the method may include steps wherein if the direction of the turn is right, then also rotating the right wheel so as to propel the vehicle in reverse. A particular example of the method may include steps wherein the left and right wheels are rotated through respective angles such that the only motion of the left and right casters is rotation about respective left and right vertical axes passing through respective ground contact patches of the left and right casters. In another particular example, the method may further comprise:
  initially applying equal torque to the left and right wheels to move the vehicle into the turn; and
  applying increased torque to the wheel on an outside of the turn.

This invention concerns a control system for establishing a steering angle of a steerable caster while a vehicle is stationary. One example embodiment of the control system according to the invention comprises a controller. A steering wheel sensor is in communication with the controller. The steering wheel sensor measures a magnitude and direction of a turn of a steering wheel and sends signals indicative of the magnitude and direction of the turn to the controller. A left wheel actuator is in communication with the controller for adjusting the rotational angle of the left wheel. A right wheel actuator is in communication with the controller for adjusting the rotational angle of the right wheel. A caster actuator is in communication with the controller for adjusting the rotation of a steerable caster. In this example embodiment the controller is adapted to receive the signals indicative of the magnitude and direction of the turn, rotate the steerable caster about a caster axis in a direction consistent with the direction of the turn through a steering angle proportional to the magnitude of the turn, and rotate at least one of the left and right wheels so as to turn the vehicle in a direction consistent with the direction of the turn and in proportional to the magnitude of the turn pursuant to a control method executed by the controller.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed steering control systems, reference is made to the accompanying figures, wherein:

FIG. 28 is a flow chart depicting portions of an example method for establishing an angle of a steerable caster according to the invention;

FIG. 29 is a flow chart depicting portions of an example method for establishing an angle of a steerable caster according to the invention;

FIG. 30 is a flow chart depicting portions of an example method for establishing an angle of a steerable caster according to the invention;

FIG. 32 is a flow chart depicting portions of an example method for establishing an angle of a steerable caster according to the invention;

FIG. 33 is a flow chart depicting portions of an example method for establishing an angle of a steerable caster according to the invention;

FIG. 34 is a flow chart depicting portions of an example method for establishing an angle of a steerable caster according to the invention;

FIG. 36 is a flow chart depicting portions of an example method for establishing an angle of a steerable caster according to the invention; and FIG. 37 is a flow chart depicting portions of an example method for establishing an angle of a steerable caster according to the invention.

DETAILED DESCRIPTION

Figure 1:
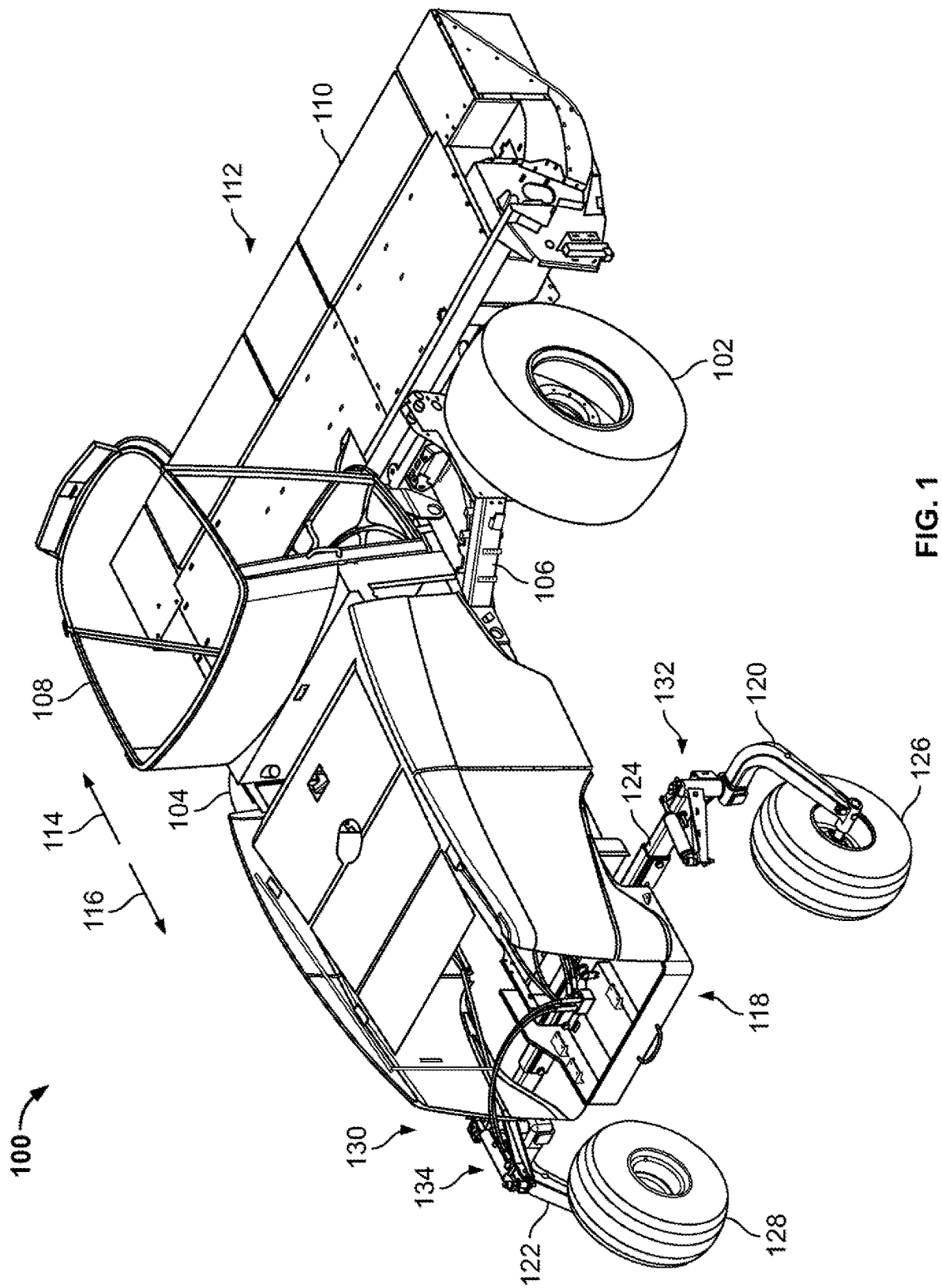
FIG. 1 is a perspective view of a windrower with an exemplary steering control system of the present disclosure.

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g., 3, 4, or 5.

The term "plurality" as used herein is defined as any amount or number greater or more than 1. In some embodiments, the term "plurality" means 2, 3, 4, 5, 6 or more.

The terms "left" or "right" are used herein as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes.

The term "about" as used herein when referring to a measurable value such as an amount, a temporal duration, and the like, is meant to encompass variations of ±20%, ±10%, ±5%, ±1%, ±0.5%, ±0.4%, ±0.3%, ±0.2%, ±0.1%, ±0.09%, ±0.08%, ±0.07%, ±0.06%, ±0.05%, ±0.04%, ±0.03%, ±0.02% or ±0.01% from the specified value, as such variations are appropriate to perform the disclosed methods.

The term "harvester" as used herein is defined as a machine that consolidates and/or packages material so as to facilitate the storage and handling of the material for later use. In some embodiments, the harvester is used to harvest agricultural material. In some embodiments, the harvester is a windrower, a forage harvester, lawn mower or a combine including a baling mechanism. In some embodiments, the harvester is a self-propelled windrower.

The term "material" as used herein is defined as a numerous individual items that are harvested or collected by the harvester. In some embodiments, the material is agricultural crop, such as hay or silage. In some embodiments, the material is biomass.

The term "drive system" or "steering system" as used herein is defined as an assembly, hydraulic or mechanical arrangement that allows for control of the front and/or rear wheels of the harvester.

The term "information" as used herein is defined as data values attributed to parameters. In some embodiments, information is digital and/or analog information. In some embodiments, information is the current operable mode of the harvester. In some embodiments, warning information can be audio and/or visual information. In some embodiments, warning information is information that is capable of alerting an operator that an action may need to be taken.

Discussions herein utilizing terms such as, for example, "processing," "computing," "calculating," "determining," or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, or harvester. In some embodiments, the harvester includes a software system with executable code that executes different hydraulic states based on operator steering of the harvester. In some embodiments, the disclosure also relates to a computer software product with executable code that automatically toggles between or through different hydraulic states based on operator steering of the harvester. The software program product may be on any medium or a component of a system optionally configured for update or install into the software of an existing harvester.

In some embodiments, the medium may be or may include an electronic, magnetic, optical, electromagnetic, InfraRed (IR), or semiconductor system (or apparatus or device) or a propagation medium. Some demonstrative examples of a computer-readable medium may include a semiconductor or solid state memory, magnetic tape, a removable computer diskette, a Random Access Memory (RAM), a Read-Only Memory (ROM), a rigid magnetic disk, an optical disk, or the like. Some demonstrative examples of optical disks include Compact Disk-Read-Only Memory (CD-ROM), Compact Disk-Read/Write (CD-R/W), DVD, or the like.

In some embodiments, the disclosure relates to a processing system including a processing device suitable for storing and/or executing program code and may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution. In some embodiments, the memory is capable of storing preferred settings or information about steering of the harvester. In some embodiments, the system includes one or a plurality of sensors to detect the steering selected by the operator. The sensors may be hard wired to one or more wires creating a physical connection to one or a plurality of controllers and/or are active sensors can be activated and used over a WiFi hotspot, Bluetooth® or other internet connection with controllers capable of receiving such remote signals.

In some embodiments, input/output or I/O devices (including but not limited to keyboards, displays, pointing devices, etc.) may be coupled to the system either directly or through intervening I/O controllers. In some embodiments, I/O devices may be coupled to the system directly or to I/O controller by an I/O bus (cables and or wires which connect the devices and enable the information to pass therebetween). In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used. Any sensor disclosed herein may function on any disclosed harvester by integration into one or more data processing systems of the harvester. For example, in some embodiments, the disclosure relates to a data processing system including executable software program product configured for sending and receiving information about the steering of the harvester. In some embodiments, the system may be configured by the operator to transition the harvester between different hydraulic states in synchrony or substantial synchrony to operator-initiated steering of the harvester. In some embodiments, the data processing system of the harvester transitions the harvester between different hydraulic states in synchrony or substantial synchrony to operator-initiated steering of the harvester depending upon real-time information sent to a controller by a sensor that monitors the steering wheel actuation.

The term "real-time" and the phrase "in real-time" as used herein are defined as a way of describing a process, event, or action that occurs simultaneously with the process of actively operating a harvester. In some embodiments, various sensors continuously sense information about the steering operation of the harvester and transmit that information to a controller in real-time. In some embodiments, an operator may adjust values or thresholds for one or more hydraulic states in real-time through the operator interface by accessing the system electronically and inputting one or a plurality of values.

Many of the fastening, connection, processes and other means and components utilized in this disclosure are widely known and used in the field of the disclosure described, and their exact nature or type is not necessary for an understanding and use of the disclosure by a person skilled in the art, and they will not therefore be discussed in significant detail. Furthermore, the various components shown or described herein for any specific application of this disclosure can be varied and the practice of a specific application of any element may already be widely known or used in the art by persons skilled in the art and each will likewise not therefore be discussed in significant detail.

Windrowers and tractors, such as self-propelled windrowers, are well known in the agricultural industry, and the instant invention can be used with substantially any of such machines. Reference is made, for example, to U.S. Pat. Nos. 9,101,090 and 8,020,648; that illustrate such windrowers, the disclosures of which are incorporated herein by reference in their entireties. Embodiments of the present invention are particularly well suited, but in no way limited to, use with windrowers. The present invention may also find utility in agricultural harvesters including, for example, a self-propelled windrower, a forage harvester, cotton harvester or a lawn mower. Embodiments of the present disclosure are particularly well suited, but in no way limited to, use with any vehicle with a front and rear steer system.

In some embodiments, the method is performed by a harvester comprising a crop supply chamber, a crop gating system, and one or more sensors. In some embodiments, the one or more sensors are capable of determining a range of information, including, but not limited to, one or a combination of: the size of a bale in the bale chamber (diameter and/or weight), the position of the tailgate, the position of the control arm, the position of the rear wall, and the position of the crop gating system. In some embodiments, the one or more sensors are in electronic communication with one or more controllers. In some embodiments, sensors can be used to determine that the caster cylinders are fully retracted or extended.

FIG. 1 shows a perspective view of an exemplary windrower 100. The windrower 100 generally includes front wheels 102, 104 rotatably mounted to a frame 106. The windrower 100 includes a cabin 108 mounted to the frame 106. The cabin 108 is configured and dimensioned to receive an operator, and has a plurality of controls for operation of the windrower 100, such as controlling a header 110 attachable to the front 112 of the windrower 100, controlling movement of the windrower in a forward direction 114, and controlling movement of the windrower 100 in a reverse direction 116.

At the rear 118, the windrower 100 includes casters 120, 122 rotatably mounted on opposing sides of a rear axle 124 of the frame 106. The windrower 100 includes two independent caster wheels 126, 128 mounted to the respective casters 120, 122, one on the left-hand side and one on the right-hand side of the windrower 100. The windrower includes a steering control system 130 including a damping assembly 132 (e.g., a passive damper, shock absorbers, or the like) and a steering assembly 134 (e.g., a hydraulic steering cylinder) mounted to the frame 106. As will be discussed in greater detail below, the damping assembly 132 provides damping functionality to one of the casters 120, 122, and the steering control system 130 provides steering functionality to the other caster 120, 122. As such, only one of the casters 120, 122 is damped and the other caster 120, 122 is steered. Although illustrated as located on the left-hand and right-hand sides, it should be understood that the position of the damping and steering assemblies 132, 134 could be reversed.

Figure 2:
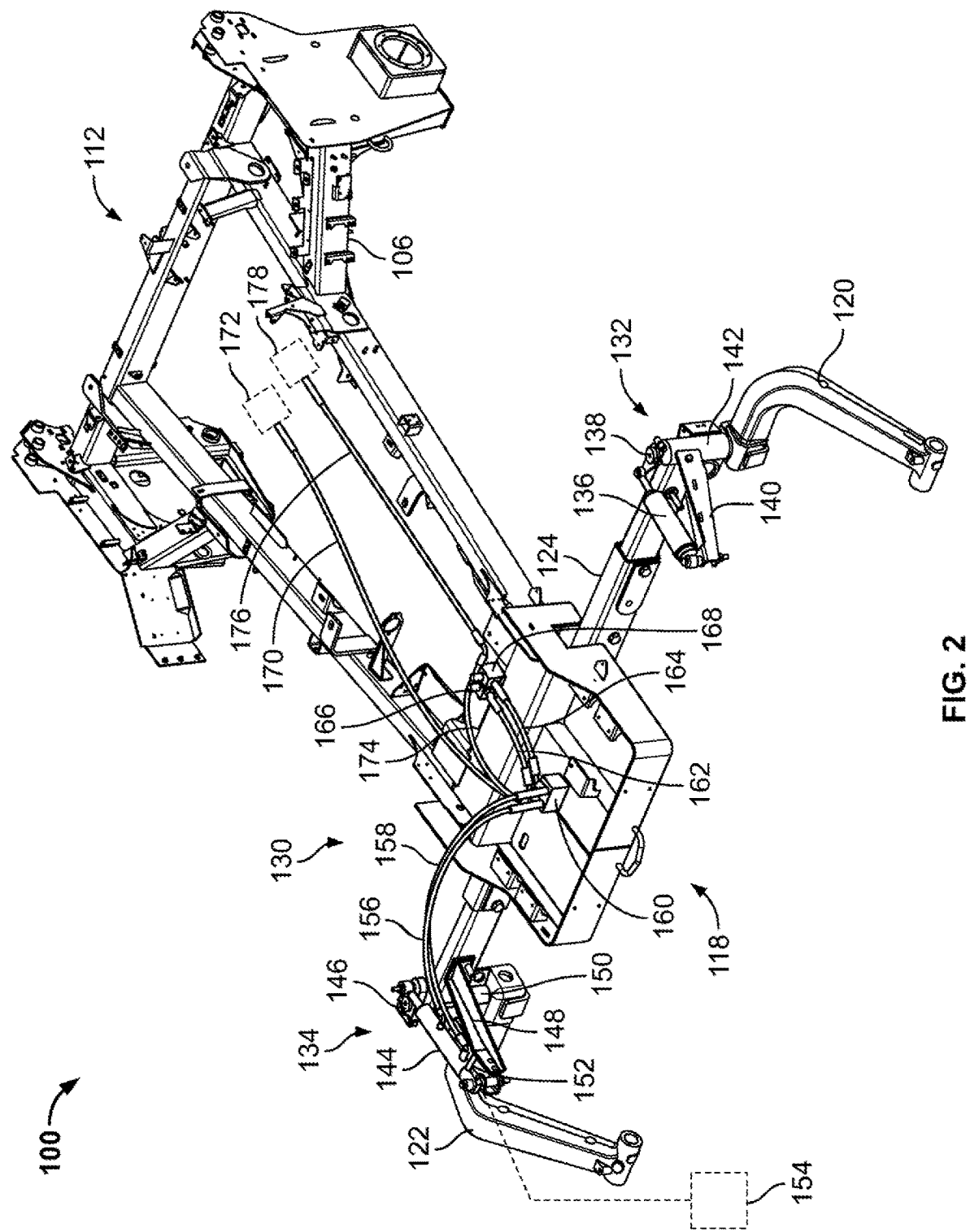
FIG. 2 is a perspective view of a windrower with an exemplary steering control system of the present disclosure.
Figure 3:
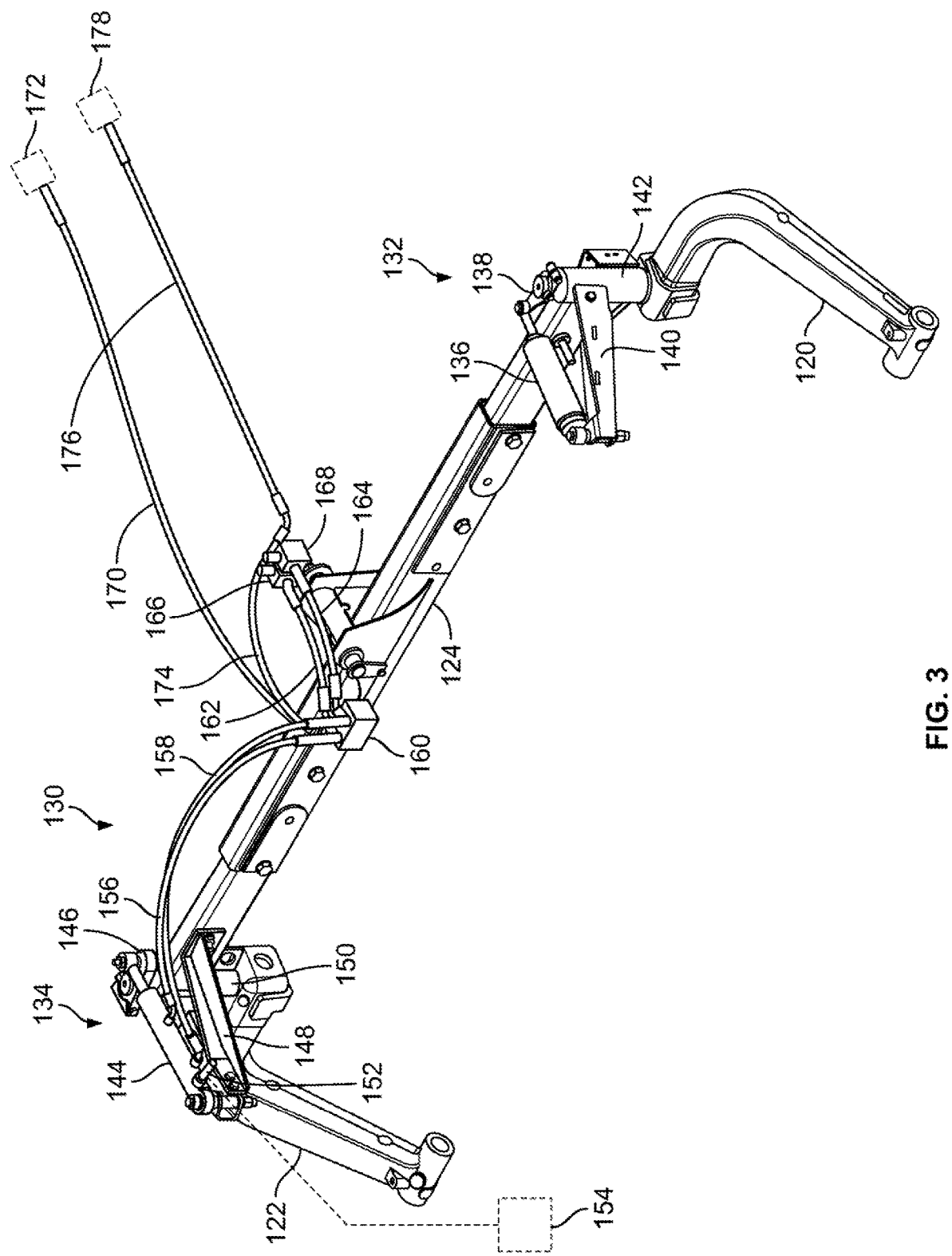
FIG. 3 is a perspective view of a rear axle of a windrower with an exemplary steering control system of the present disclosure.
Figure 4:
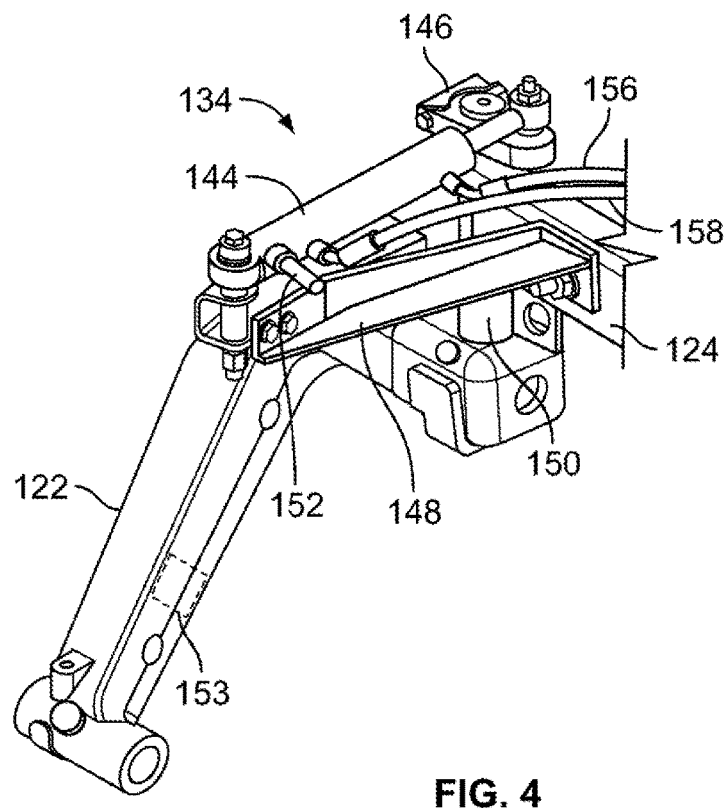
FIG. 4 is a detailed view of a steering assembly of an exemplary steering control system of the present disclosure.
Figure 5:
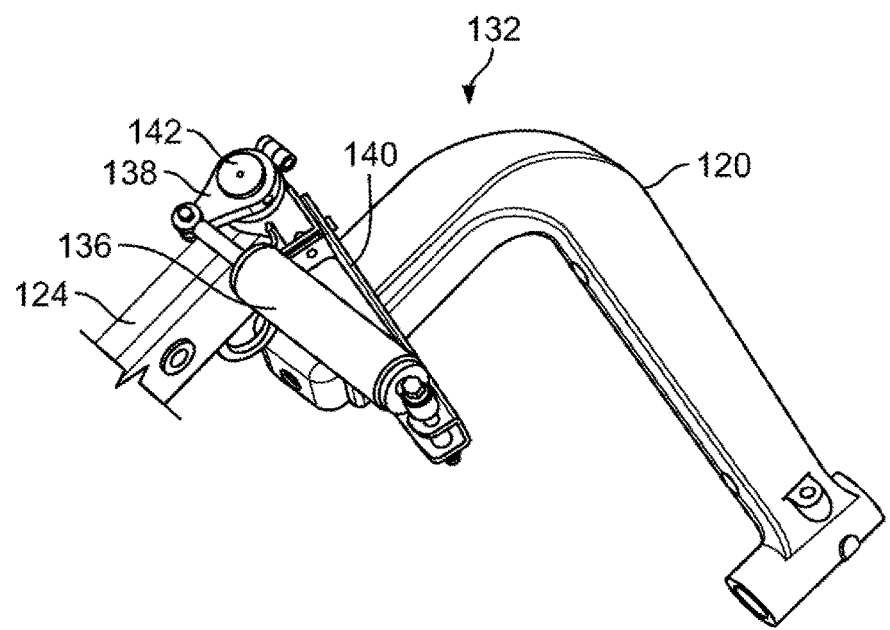
FIG. 5 is a detailed view of a damping assembly of an exemplary steering control system of the present disclosure.

FIGS. 2 and 3 show perspective views of the windrower 100 and rear axle 124 of the windrower with the steering control system 130. FIGS. 4 and 5 show detailed views of the steering and damping assemblies 134, 132 of the steering control system 130. The damping assembly 132 includes a passive damper 136 (e.g., a shock absorber, a shimmy damper, or the like) pivotably coupled at one end to an arm 138 and pivotably coupled at the opposing end to a flange 140. The damper 136 passively damps the oscillation of the caster 120 without providing any steering action of the caster 120. The opposing end of the arm 138 is rigidly coupled to the top of an upright shaft 142 and is rotatable about a pivot axis defined by the upright shaft 142 (e.g., the pivot axis of the caster 120) with the caster 120. The shaft 142 and the arm 138 thereby rotate together with the caster 120. The opposing end of the flange 140 is fixedly coupled to the axle 124 and does not pivot. The upright shaft 142 pivots within the axle 124 with the flange 140 remaining in a fixed, rigidly mounted position on the axle 124. The rigid position of the flange 140 allows for the extension and retraction of the damper 136 as the assembly of the arm 138, the shaft 142, and the caster 120 rotates about the axis of the shaft 142. The extension and retraction of the damper 136, in turn, provides damping to the caster 120.

The steering assembly 134 includes a steering cylinder 144 (e.g., a hydraulic cylinder) pivotably coupled at one end to an arm 146 and pivotably coupled at the opposing end to a flange 148. The cylinder 144 can be hydraulically actuated to extend or retract, thereby providing steering to the left-hand side caster 122. The opposing end of the arm 146 is rigidly coupled to the top of an upright shaft 150 and is rotatable about a pivot axis defined by the upright shaft 150 (e.g., the pivot axis of the caster 122) with the caster 122. The shaft 150 and the arm 146 thereby rotate together with the caster 122. The opposing end of the flange 148 is fixedly coupled to the axle 124 and does not rotate with the shaft 150. The arm 146 is rigidly coupled to the shaft 150, with the shaft 150 rigidly connected to the caster 122. The arm 146, the shaft 150, and the caster 122 thereby rotate within the upright of axle 124 about the axis of the shaft 150. The steering assembly 134 includes one or more sensors 152 capable of detecting the position or amount of extension/retraction of the cylinder 144, and transmits data corresponding to the position of the cylinder 144 to a controller module 154 as feedback regarding steering of the caster 122.

Hydraulic lines 156, 158 (e.g., pressure and vent lines) connect the cylinder 144 to a steering proportional valve 160. Hydraulic lines 162, 164 connect the steering proportional valve 160 to respective blocking valves 166, 168. Hydraulic line 170 connects the steering proportional valve 160 to a steering pump 172. Hydraulic line 174 connects the steering proportional valve 160 to hydraulic line 176, which connects to tank 178, and hydraulic line 176 connects the blocking valves 166, 168 to a tank 178. The hydraulic lines can be actuated to extend or retract the cylinder 144. Extension or retraction of the cylinder 144 results in pivoting of the caster 122 at the upright shaft 150, allowing for steering of the caster 122. The steering control system 130 thereby provides for single wheel rear axle steering of the windrower 100.

Figure 6:
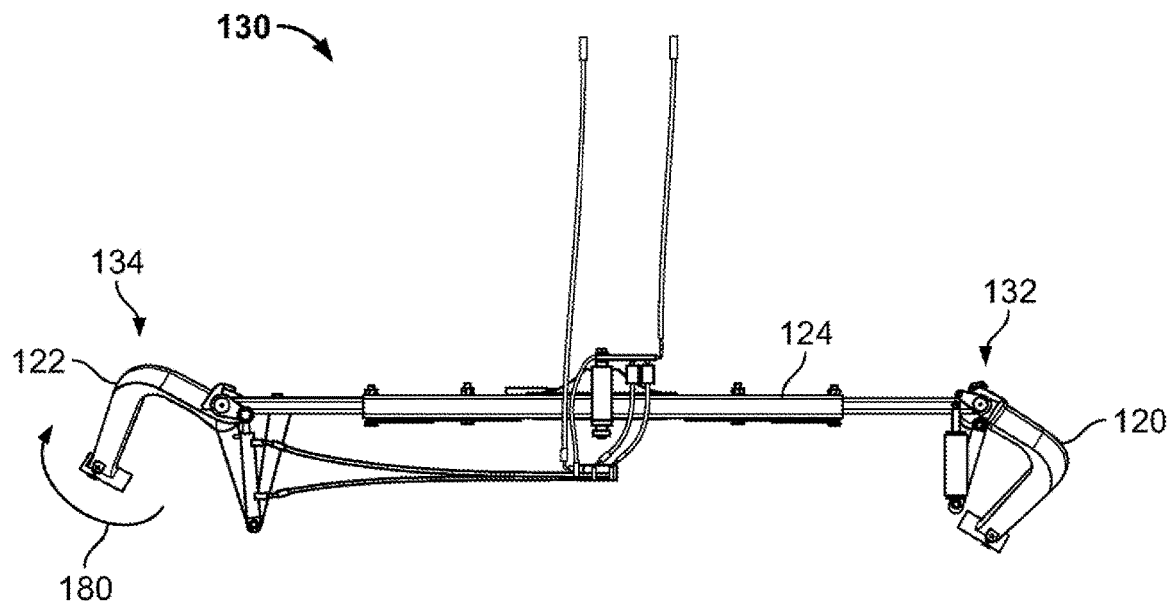
FIG. 6 is a top view of an exemplary steering control system of the present disclosure in a left turn operation.
Figure 7:
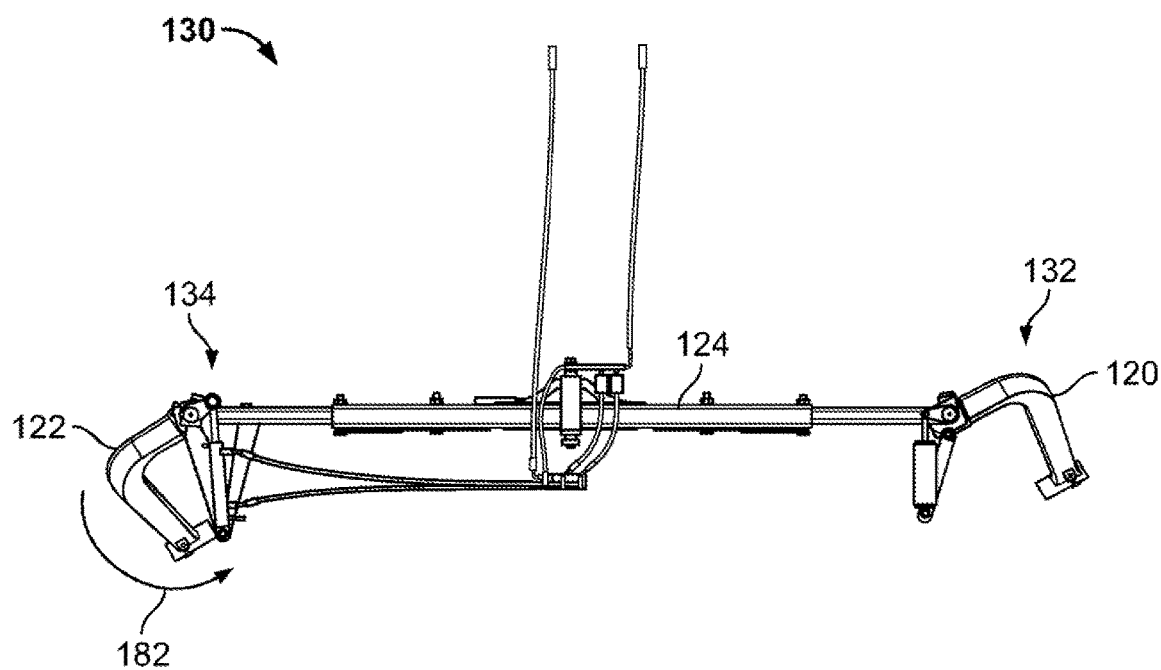
FIG. 7 is a top view of an exemplary steering control system of the present disclosure in a right turn operation.

FIG. 6 is a top view of the steering control system 130 in a left turn operation. Arrow 180 represents the direction of rotation of the caster 122 as actuated by the steering assembly 134. In the left turn operation, the steering assembly 134 is hydraulically controlled to retract the cylinder 144. FIG. 7 is a top view of the steering control system 130 in a right turn operation. Arrow 182 represents the direction of rotation of the caster 122 as actuated by the steering assembly 134. In the right turn operation, the steering assembly 134 is hydraulically controlled to extend the cylinder 144. In both left and right turn operations, steering of the windrower 100 is controlled by a combination of the front wheel dual-path steering and the left-hand side rear wheel steering assembly 134, while the right-hand side wheel passively casters to follow the control of steering with the damping assembly 132 providing passive damping during castering.

The exemplary steering control system 130 therefore provides for active steering control to one of the two rear wheels on the windrower 100, while the other rear wheel remains passively castering during the rear axle steering mode. Steering of one of the rear wheels, particularly during high-speed operation, provides additional stability to the front drive dual-path steering system rather than providing primary steering control. Thus, rather than providing the primary steering control of the windrower 100, steering of one of the rear wheels assists in stabilizing the system overall during high-speed and normal operation modes of the windrower 100.

As compared to conventional windrowers, the windrower 100 includes a steering cylinder 144 coupled to one of the casters 120, 122 that allows for directional control of the caster 120, 122, while the other caster 120, 122 maintains a traditional shimmy damper configuration without active steering control. The cylinder 144 uses the sensor 152 (e.g., internal cylinder position sensor, external position sensor, radial potentiometer, proximity sensor, or the like) to determine and transmit the radial position of the caster 122 to a controller. A control valve manifold can be used to extend and retract the steering cylinder 144. A steering pump 172 can be used to provide pressure/flow to the manifold, and valves and lines can provide a path for flow to return to tank 178 during field operation. An electronic steering wheel/device position sensor can be used to provide operator commanded steering wheel/device position to the controller, with such data used by the controller to calculate and execute the commanded steering position (e.g., extension or retraction of the cylinder 144) via a control algorithm.

The windrower 100 can remain in front drive dual-path steering during the different operation modes of the windrower 100, with the rear steering acting to supplement or assist in stabilizing operation of the windrower 100. In some embodiments, steering in the field can be provided only by the front drive dual-path steering, while the rear axle steering can function along with the dual-path steering during high-speed (e.g., road) operation mode. As noted above, the steering cylinder 144 connects to an arm 146 attached to the top of the upright shaft 150 (e.g., a caster vertical pivot shaft) at one end and the rear axle 124 (via the flange 148) at the opposing end.

The rod and barrel ports of the cylinder 144 can be plumbed to the proportional steering valve 160. The hydraulic lines to the steering cylinder 144 have blocking valves 166, 168 to tank 178 that are normally open, allowing free flow of fluid into and out of the cylinder 144 during field operation. Blocking valves 166, 168 are provided to block flow back to tank 178 in the rear axle steering mode. When all blocking valves 166, 168 are blocking flow back to tank 178, the movement of the steering cylinder 144 can be controlled by the steering valve 160.

In the field/free castering operation mode, all blocking valves 166, 168 are actuated into the open position, allowing free flow of fluid into and out of the steering cylinder 144. The steering cylinder 144 is extended and retracted based on the caster 122 position due to steering control from the front drive wheels. The steering valve 160 remains in the centered or closed position during this operation. The steering cylinder 144 acts as a caster damper during the field operation mode as the flow of fluid into and out of the cylinder 144 provides a viscous damping force on the steered caster 122. The non-steered caster 120 receives damping force from the passive shimmy damper 136 during field operation.

In the rear axle steering operation, the operator selects rear axle steering operation through the operator console in the cab or another command switch (e.g., at a user interface). The operator can be prompted to drive straight forward in order to orient the steered caster 122 and rear wheel 128 behind the rear axle 124 as this is this orientation of the caster 122 during rear axle steering operation. In some embodiments, a proximity sensor 153 can be incorporated into the steering assembly 134 to detect and transmit data to the controller regarding the position of the caster 122 and/or wheel 128 relative to the rear axle 124 (see FIG. 4). In some embodiments, a similar proximity sensor can be disposed on the caster 122 to detect and transmit data to the controller regarding the position of the caster 122 and/or wheel 126 relative to the rear axle 124. For example, a magnetic sensor on the caster 122 and a fixed target on the rear axle 124 can be used to sense when the caster 122 is in a position behind the rear axle 124 prior to initiating the rear axle steering operation.

Figure 8:
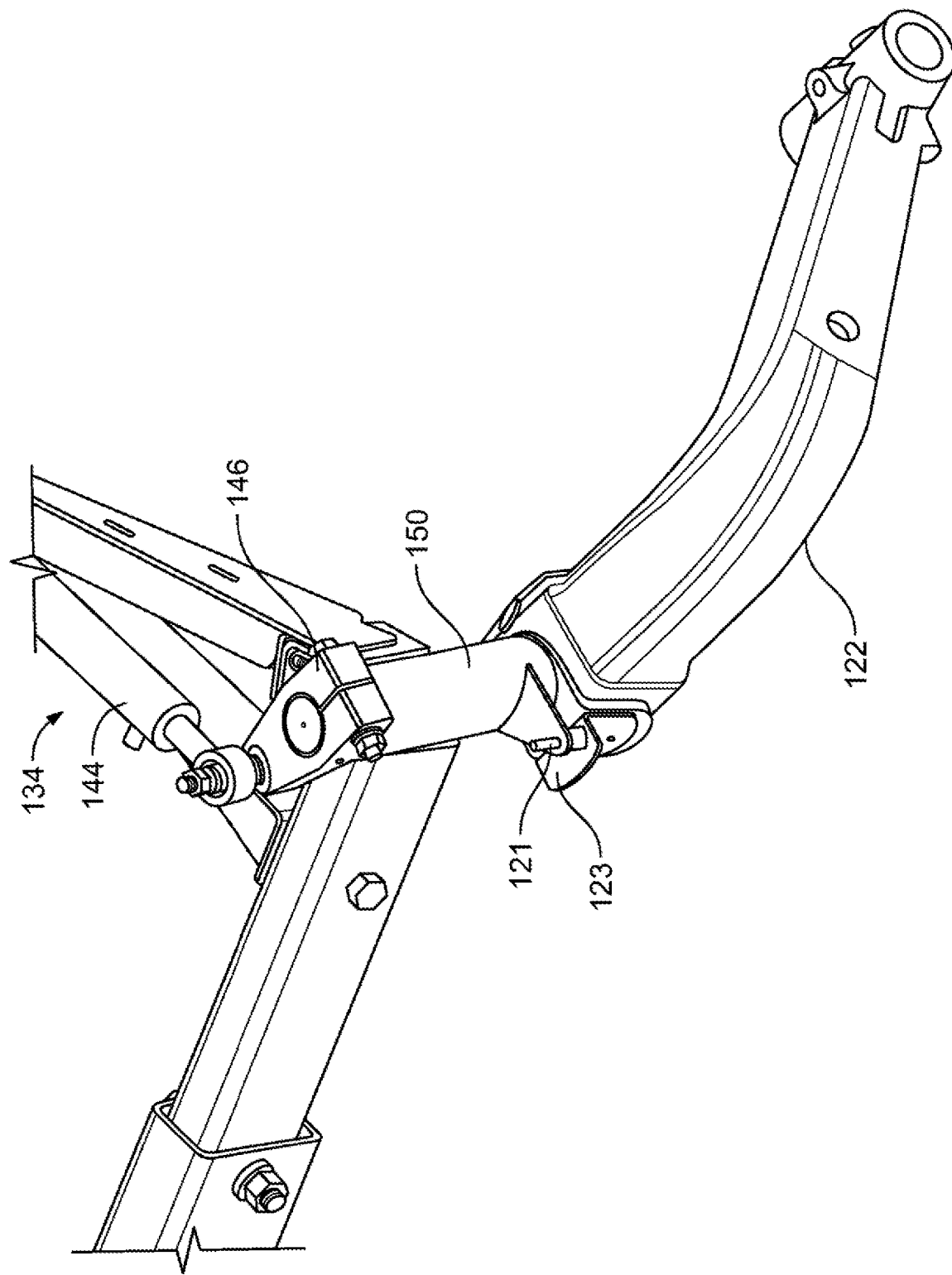
FIG. 8 is a detailed view of a steering assembly of an exemplary steering control system of the present disclosure.

FIG. 8 is a detailed view of the steering assembly 134. As noted above, in some embodiments, a proximity sensor 121 can be rigidly coupled to the axle 124 via the casing for the shaft 150. In some embodiments, the sensor 121 can be disposed within an opening of a flange extending from the casing for the shaft 150. A target 123 can be rigidly coupled to the caster 122. The target 123 can rotate with rotation of the caster 122 with the sensor 121 detecting the target 123 only when the caster 122 has rotated behind the axle 124. Upon detection of the target 123 with the sensor 121, the rear axle steering operation can be initiated.

When the controller receives data from the sensor 152 that the steering cylinder 144 is in the steering straight position, the blocking valves 166, 168 can be actuated to shift and block all flow into and out of the steering cylinder 144. Blocking flow into and out of the steering cylinder 144 creates a closed circuit where the retraction and extension of the steering cylinder 144 (and thereby the steering direction of the steered caster 122) is controlled by the steering valve 160. To steer the rear wheel 128, the operator can input a steering command by turning the steering wheel/device to a desired position. A steering sensor receives data corresponding with the steering command (e.g., the amount of rotation of the steering wheel, the input desired rotation of the windrower 100, or the like). In some embodiments, the steering sensor can be electronically coupled to the steering wheel/device. The controller uses the position data received from the steering sensor to command a steering angle of the rear axle steering cylinder 144 with position sensing. Thus, the controller can extend or retract the steering cylinder 144 as needed to achieve the desired input at the steering wheel/device, with the sensor 152 detecting and transmitting the position of the steering cylinder 144 (and thereby the caster 122) to the controller.

Figure 9:
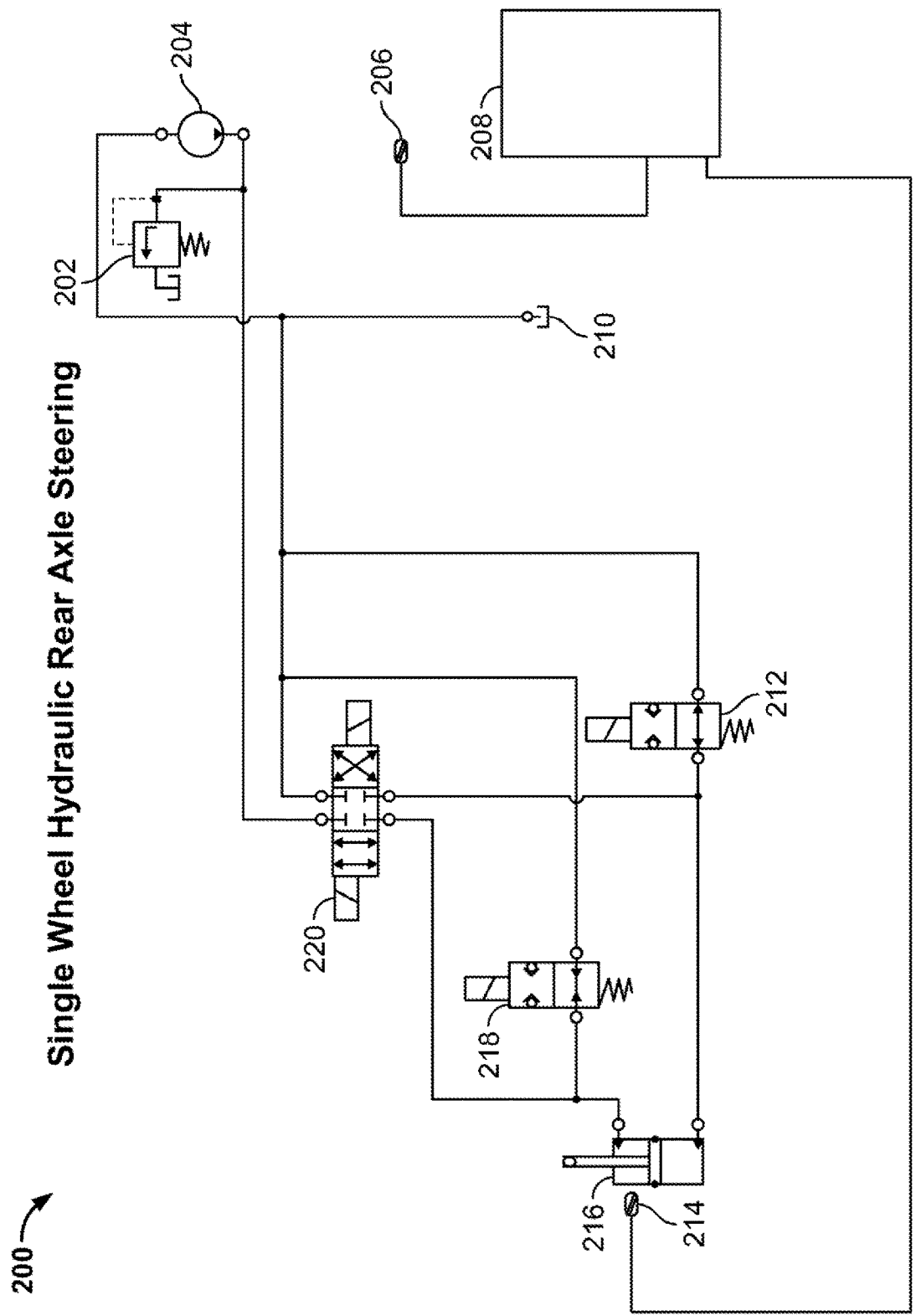
FIG. 9 is a static image of a hydraulic circuit of an exemplary steering control system of the present disclosure.

FIG. 9 is a static image of a hydraulic circuit 200 of the steering control system 130. The hydraulic circuit 200 includes a relief valve 202, a steering pump 204, a steering wheel or device position sensor 206, and a controller 208. The hydraulic circuit 200 includes a tank 210, a return to tank blocking valve 212, a return to tank blocking valve 218, and a steering proportional directional valve 220. The hydraulic circuit 200 includes a steering cylinder 216 and a cylinder position sensor 214.

Figure 10:
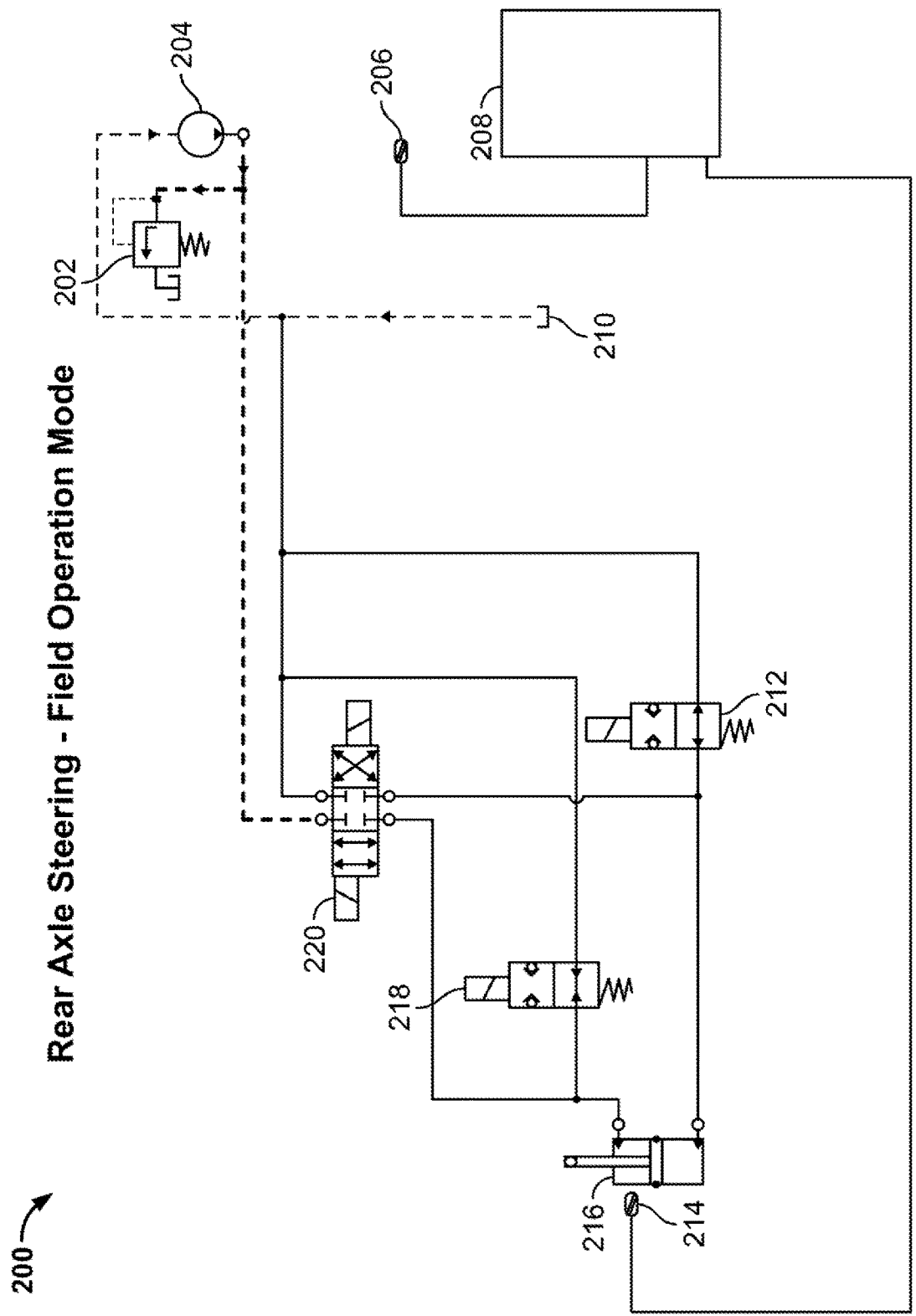
FIG. 10 is the hydraulic circuit of FIG. 9 in a field operation mode.

FIG. 10 is the hydraulic circuit 200 in an in-field operation mode. The blocking valves 212, 218 are opened, allowing free flow of hydraulic fluid into and out of the steering cylinder 216 and back to tank 210. Steering of the windrower 100 is controlled by the front drive wheel dual-path steering system only (e.g., without steering from the cylinder 216).

Figure 11:
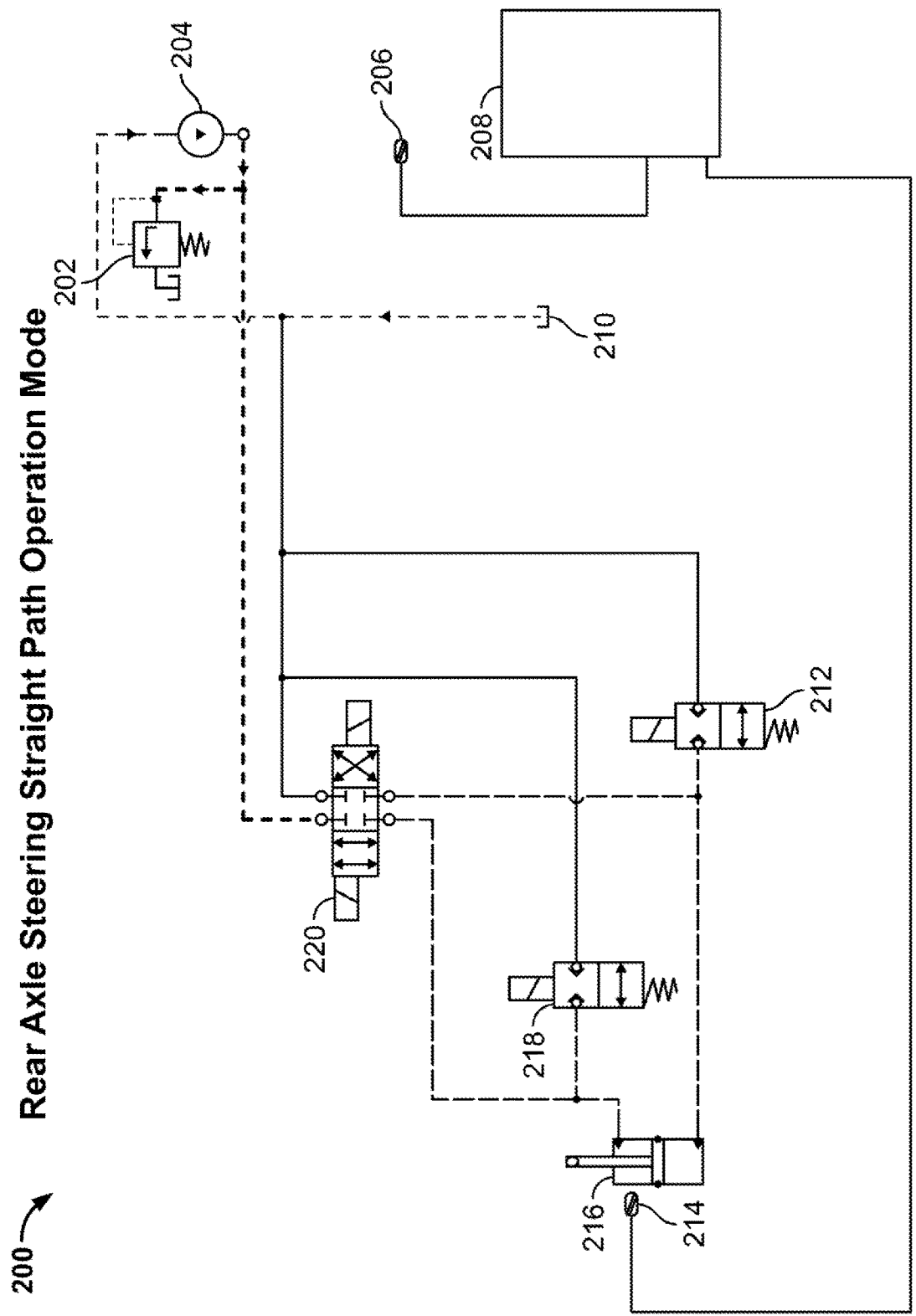
FIG. 11 is the hydraulic circuit of FIG. 9 in a straight path operation mode.

FIG. 11 is the hydraulic circuit 200 in a straight path operation mode. The steering proportional directional valve 220 is centered with the steering cylinder 216 centered (e.g., partially extended). Steering of the windrower 100 is controlled by a combination of the front drive wheel dual-path steering and the rear axle steering from the cylinder 216. The desired steering position can be provided to the controller 208 by a steering wheel or device position sensor 206, while the actual rear wheel position feedback can be provided to the controller 208 by the steering cylinder position sensor 214 (e.g., on the left-hand side caster as shown in FIGS. 1-6).

Figure 12:
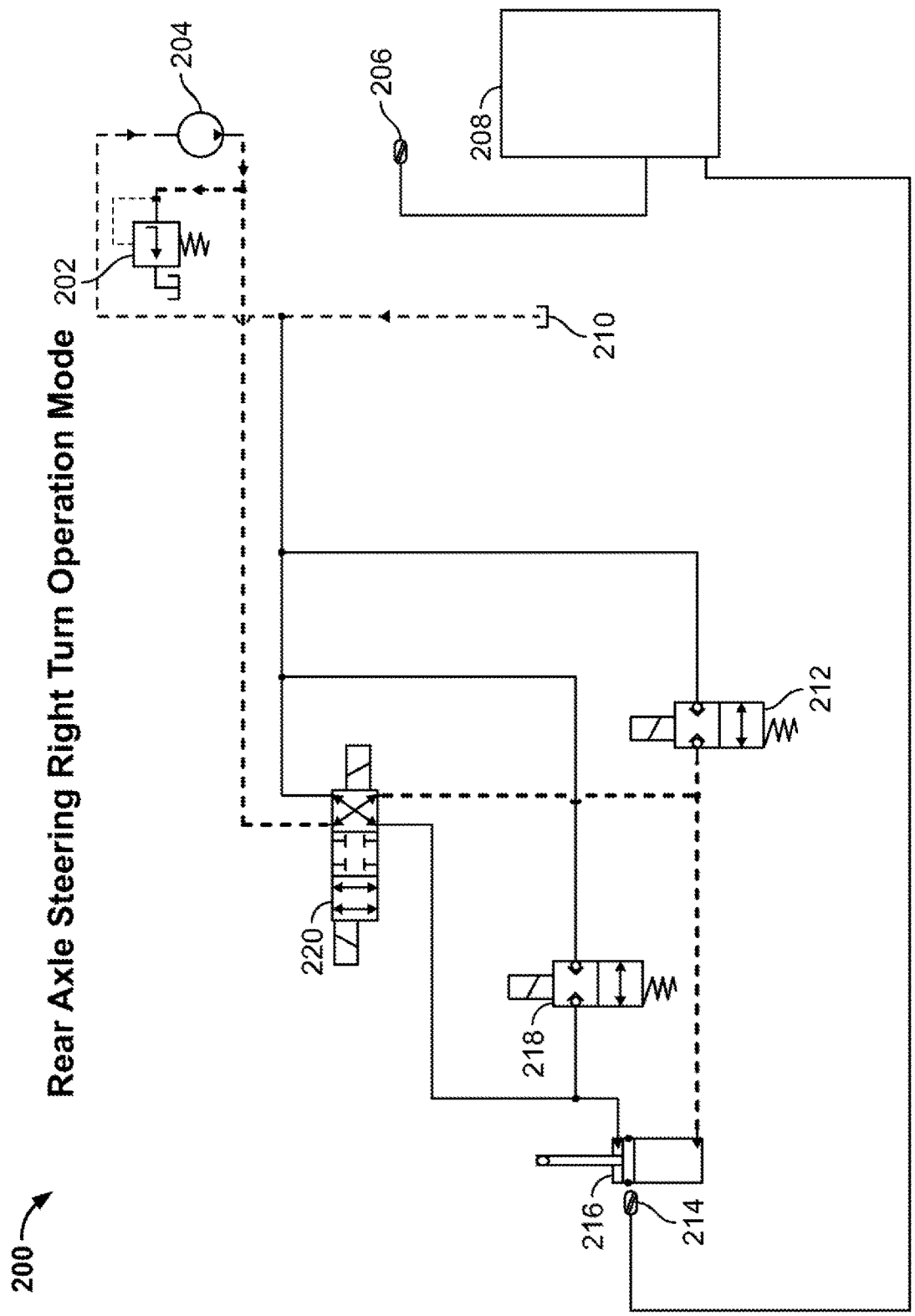
FIG. 12 is the hydraulic circuit of FIG. 9 in a right turn operation mode.

FIG. 12 is the hydraulic circuit 200 in a right turn operation mode. The steering proportional directional valve 220 is shifted to extend the steering cylinder 216, resulting in the windrower 100 turning right. Steering of the windrower 100 is controlled by a combination of the front drive wheel dual-path steering and the rear axle steering from the cylinder 216. The desired steering position can be provided to the controller 208 by a steering wheel or device position sensor 206, while the actual rear wheel position feedback can be provided to the controller 208 by the steering cylinder position sensor 214 (e.g., on the left-hand side caster as shown in FIGS. 1-6).

Figure 13:
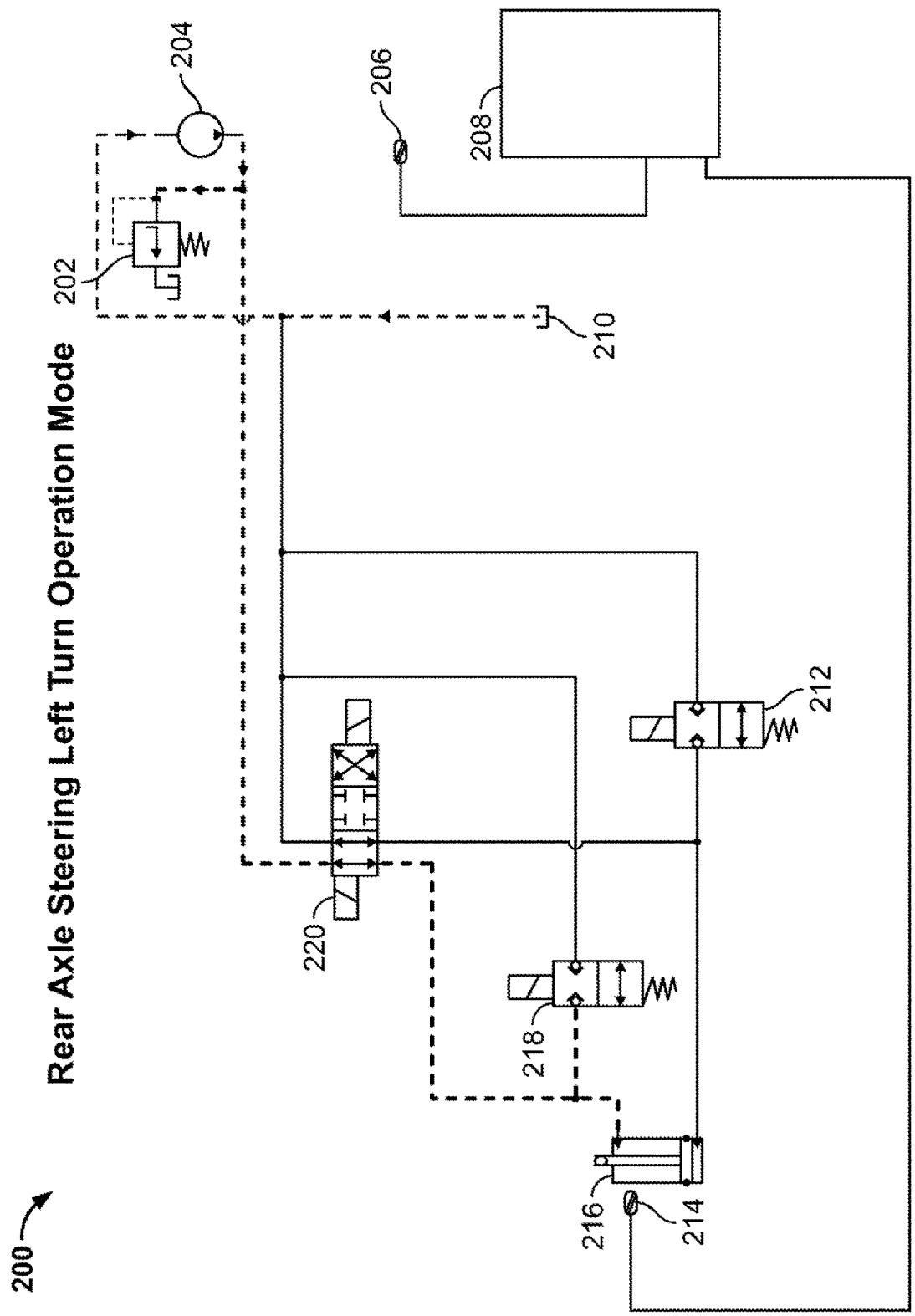
FIG. 13 is the hydraulic circuit of FIG. 9 in a left turn operation mode.

FIG. 13 is the hydraulic circuit 200 in a left turn operation mode. The steering proportional directional valve 220 is shifted to retract the steering cylinder 216, resulting in the windrower 100 turning left. Steering of the windrower 100 is controlled by a combination of the front drive wheel dual-path steering and the rear axle steering from the cylinder 216. The desired steering position can be provided to the controller 208 by a steering wheel or device position sensor 206, while the actual rear wheel position feedback can be provided to the controller 208 by the steering cylinder position sensor 214 (e.g., on the left-hand side caster as shown in FIGS. 1-6).

Figure 14:
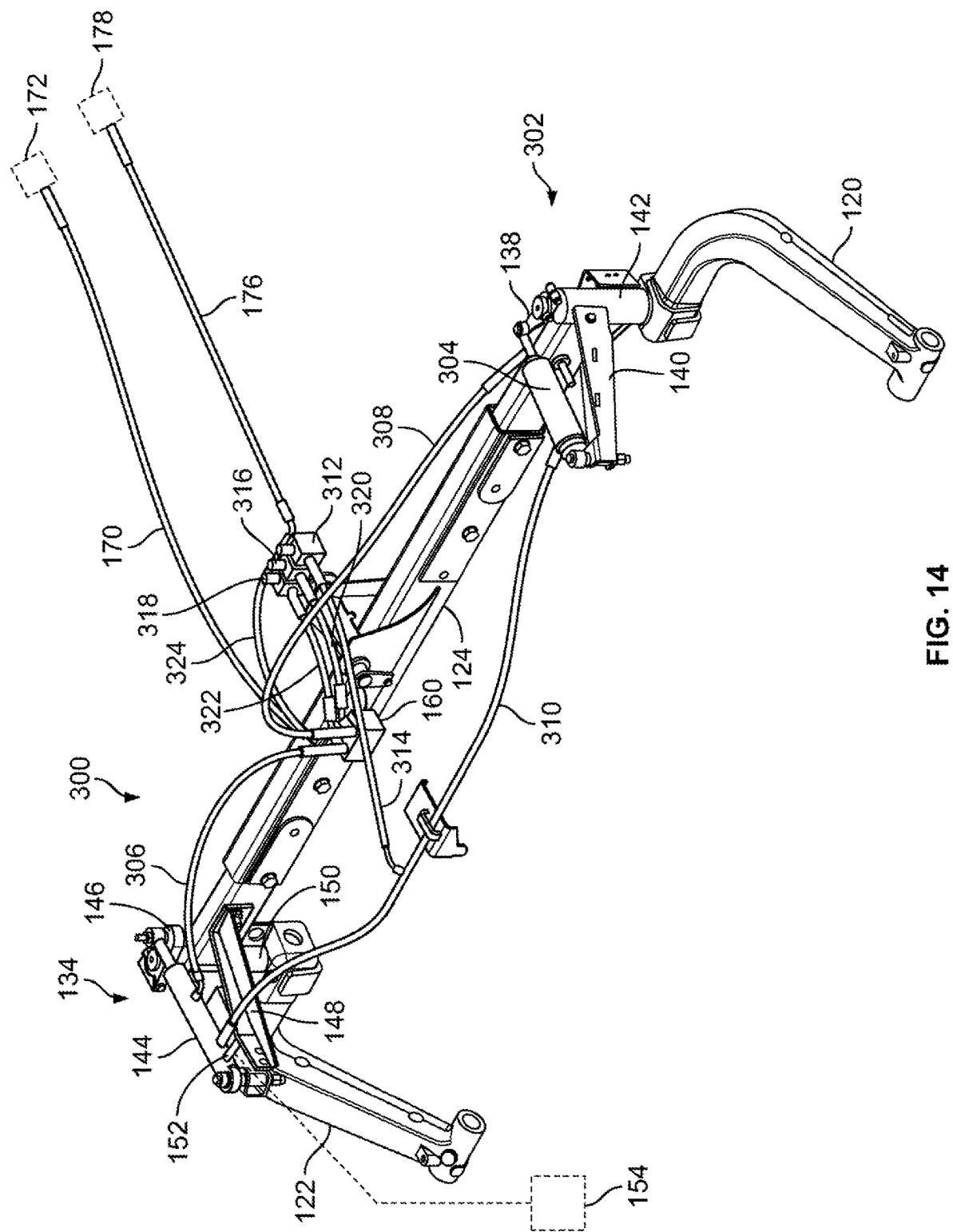
FIG. 14 is a perspective view of an exemplary steering control system of the present disclosure.
Figure 15:
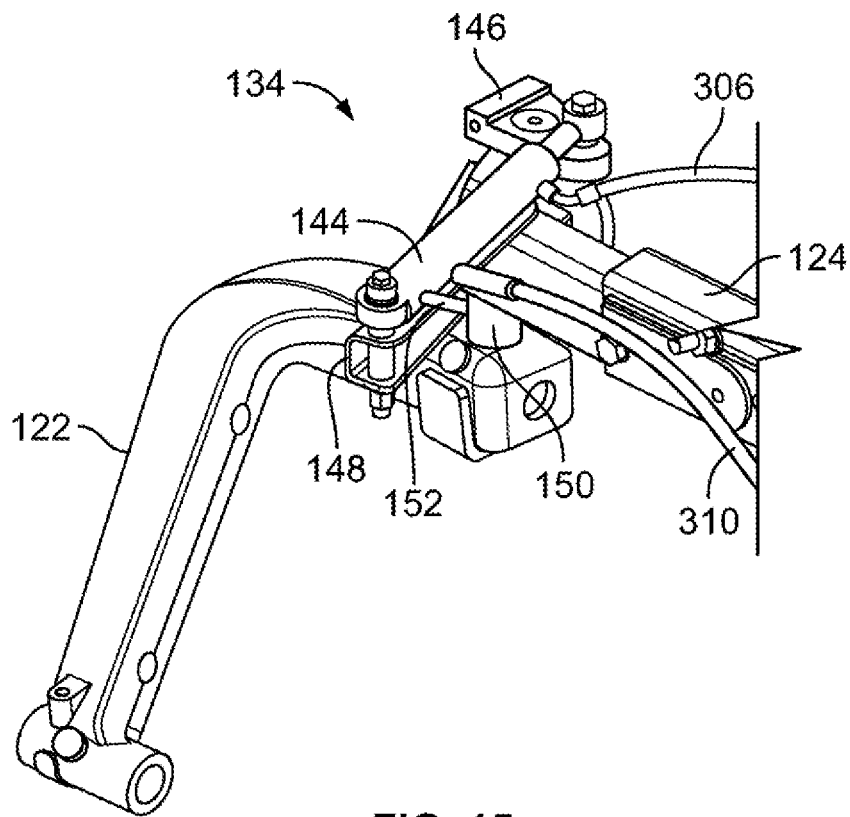
FIG. 15 is a detailed view of an exemplary steering control system of the present disclosure.
Figure 16:
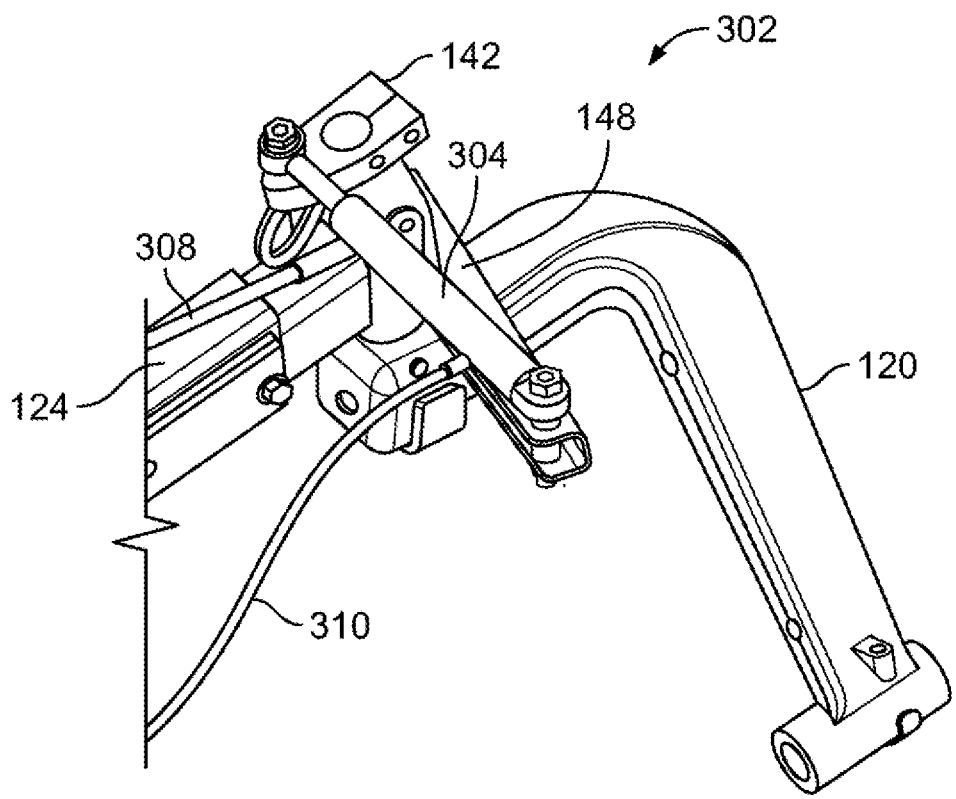
FIG. 16 is a detailed view of an exemplary steering control system of the present disclosure.

FIGS. 14-16 are perspective and detailed views of an exemplary steering control system 300 of the present disclosure. The steering control system 300 can be substantially similar in structure and function to the steering control system 130 except for the distinctions noted herein. Therefore, like reference numbers refer to like structures. Particularly, rather than having a steering assembly associated with only one caster, the steering control system 300 includes a steering assembly associated with each of the casters with only one of the steering assemblies being actuated to steer the rear wheels and the other steering assembly moving in an equal and opposite direction from the first steering assembly.

The steering assembly 134 on one of the casters 122 includes the sensor 152 in communication with the controller 154 such that the detected position of the caster 122 (based on the extension/retraction of the cylinder 144) can be used to control the cylinder 144 to achieve the desired steering of the windrower 100. Rather than a passive damper, the steering control system 300 includes a second steering assembly 302 at the other caster 120. The steering assembly 302 includes a steering cylinder 304 capable of being hydraulically actuated to extend or retract, thereby adjusting the rotational position of the caster 120.

Rather than having a sensor associated with the steering cylinder 304, the steering assembly 302 can be hydraulically coupled to the steering assembly 134 such that actuation of the steering cylinder 144 to extend or retract automatically actuates the steering cylinder 304 to extend or retract in an equal and opposite direction. The extension or retraction of the steering cylinder 304 is therefore directly tied to actuation of the steering cylinder 144 and is dependent on the single sensor 152 of the steering control system 300. Both steering cylinders 144, 304 are actuated to steer the casters 120, 122, with the position of only one of the casters 120, 122 being measured by the sensor 152 (e.g., a master/slave arrangement with the steering cylinder 144 acting as the master component and the steering cylinder 304 acting as the slave component).

Each of the steering cylinders 144, 304 is coupled to the steering proportional valve 160 via hydraulic lines 306, 308. The steering cylinders 144, 304 are coupled to each other by a hydraulic line 310, which is further coupled to a blocking valve 312 by a hydraulic line 314. The steering proportional valve 160 is coupled to blocking valves 316, 318 by hydraulic lines 320, 322. Each of the blocking valves 312, 316, 318 is coupled to tank 178 by a hydraulic line 176, and the steering proportional valve 160 is coupled to tank 178 by a hydraulic line 324. The steering proportional valve 160 is further coupled to the steering pump 172 by hydraulic line 170.

Figure 17:
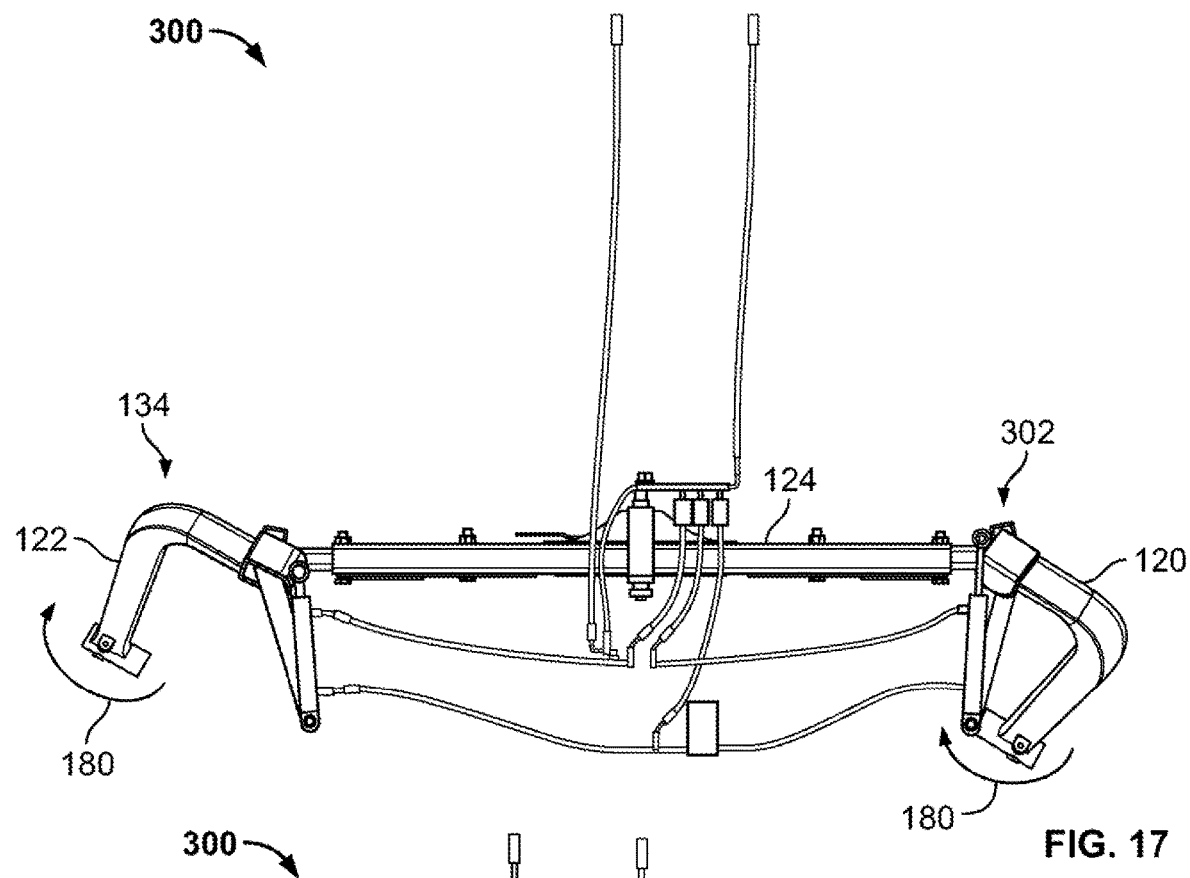
FIG. 17 is a top view of an exemplary steering control system of the present disclosure in a left turn operation.
Figure 18:
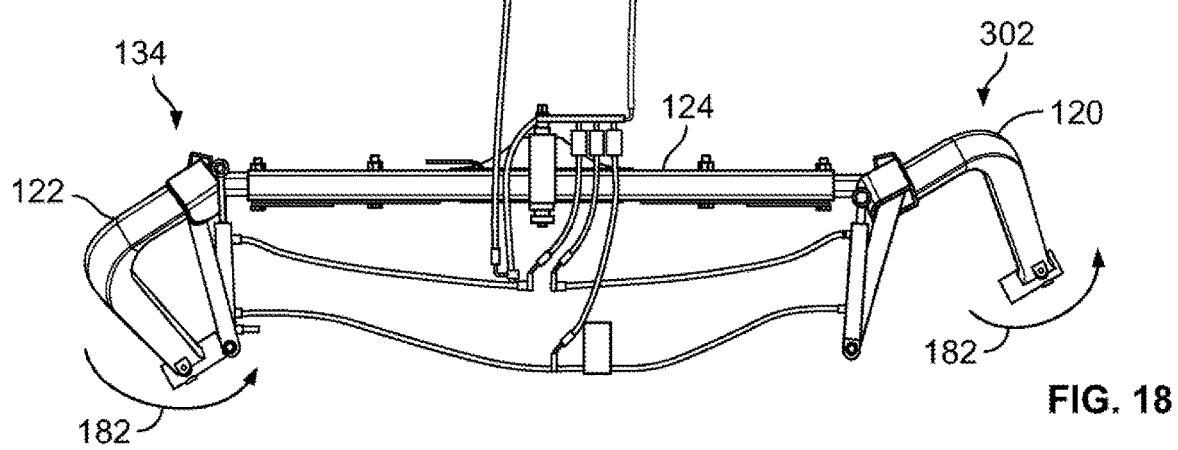
FIG. 18 is a top view of an exemplary steering control system of the present disclosure in a right turn operation.

FIG. 17 is a top view of the steering control system 300 in a left turn operation. Arrow 180 represents the direction of rotation of the caster 122 as actuated by the steering assembly 134, and the direction of rotation of the caster 120 as actuated by the steering assembly 302 tied to the steering assembly 134. In the left turn operation, the steering assembly 134 is hydraulically controlled to retract the cylinder 144, and the cylinder 304 of the steering assembly 302 is hydraulically controlled to extend in an equal and opposite direction to the cylinder 144 due to fluid connection of the barrel ends of the cylinders 144, 304. FIG. 18 is a top view of the steering control system 300 in a right turn operation.

Arrow 182 represents the direction of rotation of the caster 122 as actuated by the steering assembly 134, and the direction of rotation of the caster 120 as actuated by the steering assembly 302 tied to the steering assembly 134. In the right turn operation, the steering assembly 134 is hydraulically controlled to extend the cylinder 144, and the cylinder 304 of the steering assembly is hydraulically controlled to extend in an equal and opposite direction to the cylinder 144. In both left and right turn operations, steering of the windrower 100 is controlled by a combination of the front wheel dual-path steering and the rear wheel steering assemblies 134, 302, with the right-hand side steering assembly 302 controlled based on the left-hand side position sensor 152.

The steering control system 300 therefore provides for rear axle steering of the windrower 100 with cylinders 144, 304 hydraulically coupled to move in equal and opposite directions during operation with the position of only one cylinder 144 measured to control the steering action of the rear wheels. The steering control system 300 is capable of providing stability to the windrower 100 during high-speed operation with directional control of the rear wheels without necessitating multiple position sensing cylinders 144, 304. As noted above, the windrower 100 includes two steering cylinders 144, 304 for each respective caster 120, 122. Only one of the cylinders 144 includes a means for the controller 154 to determine the radial position of the caster 122 (e.g., an internal cylinder position sensor, an external position sensor, a radial potentiometer, or the like).

A control valve manifold can be used to extend and retract the steering cylinders 144, 304. A steering pump 172 can provide pressure or flow to the manifold, and valves and lines can provide a path for flow to return to tank 178. An electronic steering wheel/device position sensor can be used to provide an operator commanded steering wheel/device position to the controller 154 which, in turn, can be used to calculate and execute the commanded steering position via a control algorithm (e.g., the amount of extension or retraction of the cylinder 144, 304).

The windrower 100 can retain the front drive dual-path steering for all operations, with the steering control system 300 assisting in stabilizing operation of the windrower 100 in at least the high-speed operation mode. For example, steering in the field can be provided only by the front drive dual-path steering, while the rear axle steering functions along with the dual-path steering during high-speed road mode operation. The cylinders 144, 304 connect to respective arms 146, 138 attached to the top of the caster vertical pivot shaft at one end and the rear axle 124 of the windrower 100 at the other end (via flanges 148, 140).

The barrel ports of the cylinders 144, 304 can be plumbed together, while the rod ports can be plumbed to the proportional steering valve 160. The hydraulic lines to the steering cylinders 144, 304 include blocking valves 312, 316, 318 to tank 178 that are normally open, allowing free flow of fluid into and out of the cylinders 144, 304 during field operation. The blocking valves 312, 316, 318 are provided to block flow back to tank 178 in the rear axle steering mode. When all blocking valves 312, 316, 318 are blocking flow back to tank 178, movement of the steering cylinders 144, 304 can be controlled by the steering valve 160.

Such arrangement results in retraction of a first cylinder (e.g., cylinder 144) causing fluid to be displaced from the barrel end of the first cylinder and into the barrel end of the second cylinder (e.g., cylinder 304). The fluid displacement actuates the second cylinder to extend an equal amount that the first cylinder retracts when the proportional valve 160 shifts to retract the first cylinder. The setup allows a position sensor 152 to be provided on only one steering cylinder for providing steering cylinder position feedback to the controller 154.

In the field/free castering operation mode, all blocking valves 312, 316, 318 are opened, allowing free flow of fluid to and from the steering cylinders 144, 304. The steering cylinders 144, 304 extend and retract based on the caster 120, 122 position due to the steering control from the front drive wheels. The steering valve 160 remains in the centered or closed position during such operation. The steering cylinders 144, 304 act as caster dampers during field operation as the flow of fluid into and out of the cylinders 144, 304 provides a viscous damping force.

In the rear axle steering operation mode, the operator can select the rear axle steering operation through an operator console, user interface or other command switch. The operator can be prompted to drive the windrower 100 straight forward in order to orient the casters/rear wheels behind the rear axle 124 as this is the orientation of the casters 120, 122 during the rear axle steering operation. In some embodiments, one or more proximity sensors can be used to detect the position of the casters 120, 122 relative to the rear axle 124. When the controller 154 receives data indicating that the sensing cylinder 144 is in the steering straight position, the blocking valves 312, 316, 318 can be shifted to block all flow into and out of the steering cylinders 144, 304, creating a closed circuit in which the retraction of a steering cylinder on one side causes an equal and opposite extension of the steering cylinder on the other side of the windrower 100.

To steer the rear wheels, the operator can make a steering input command by turning the steering wheel or device to a desired position. Such position can be sensed by a steering sensor coupled to the steering wheel or device. The controller 154 can use the detected position of the steering wheel or device to command a steering angle of the rear axle steering cylinder 144 with position sensing. For example, the controller 154 can actuate the steering cylinder 144 to extend or retract to achieve the desired steering with the position sensor 152 providing feedback to the controller 154 regarding actuation of the cylinder 144.

Because the cylinder 144 includes the position sensor 152 and the cylinder 304 does not, the controller 154 uses the position data from the position sensor 152 for adjustments of both cylinders 144, 304. For example, the cylinder 144 can be actuated to extend by shifting the steering valve 160 to retract the cylinder 304. As a further example, if the input command necessitates that the cylinder 144 be retracted, the steering valve 160 can shift to retract the cylinder 144 which, in turn, extends the cylinder 304 due to the barrel ports of the cylinders 144, 304 being plumbed together. In some embodiments, the steering valve 160 can hydraulically connect only to the rod ends of the steering cylinders 144, 304 with no direct fluid communication with the barrel ends of the steering cylinders 144, 304.

As such, the steering control system 300 allows for one position sensing cylinder 144 to determine the radial position of the caster 122, while the second caster 120 and cylinder 304 do not necessitate position sensing. The steering valve 160 acts directly on only the rod end of the cylinder 144, reducing the flow requirement for a comparable system in which valves act on both the rod and barrel ends (e.g., due to the reduced volume of the rod end compared to the barrel end). It should be understood that the position sensing can be on either the cylinder 144 or cylinder 304.

In some embodiments, the steering valve can act on the barrel end of the cylinders, the rod end port of the steering cylinders can be plumbed together rather than the barrel ends or the like. In some embodiments, a proximity sensor can be used on the non-position sensing side to confirm that the non-sensing side is centered when entering the rear axle steering operation. For example, a magnetic sensor and a fixed target that is sensed only when the caster is in the proper rear axle steering straight orientation can be used. Alternatively, an active calibration can take place to enter the rear axle steering mode by prompting the operator to drive straight forward for a predetermined distance after the position sensing caster is in a straight orientation position. At such point, all blocking valves can block flow from the steering cylinders to tank and the system 300 can be a closed circuit with rear axle steering active.

Figure 19:
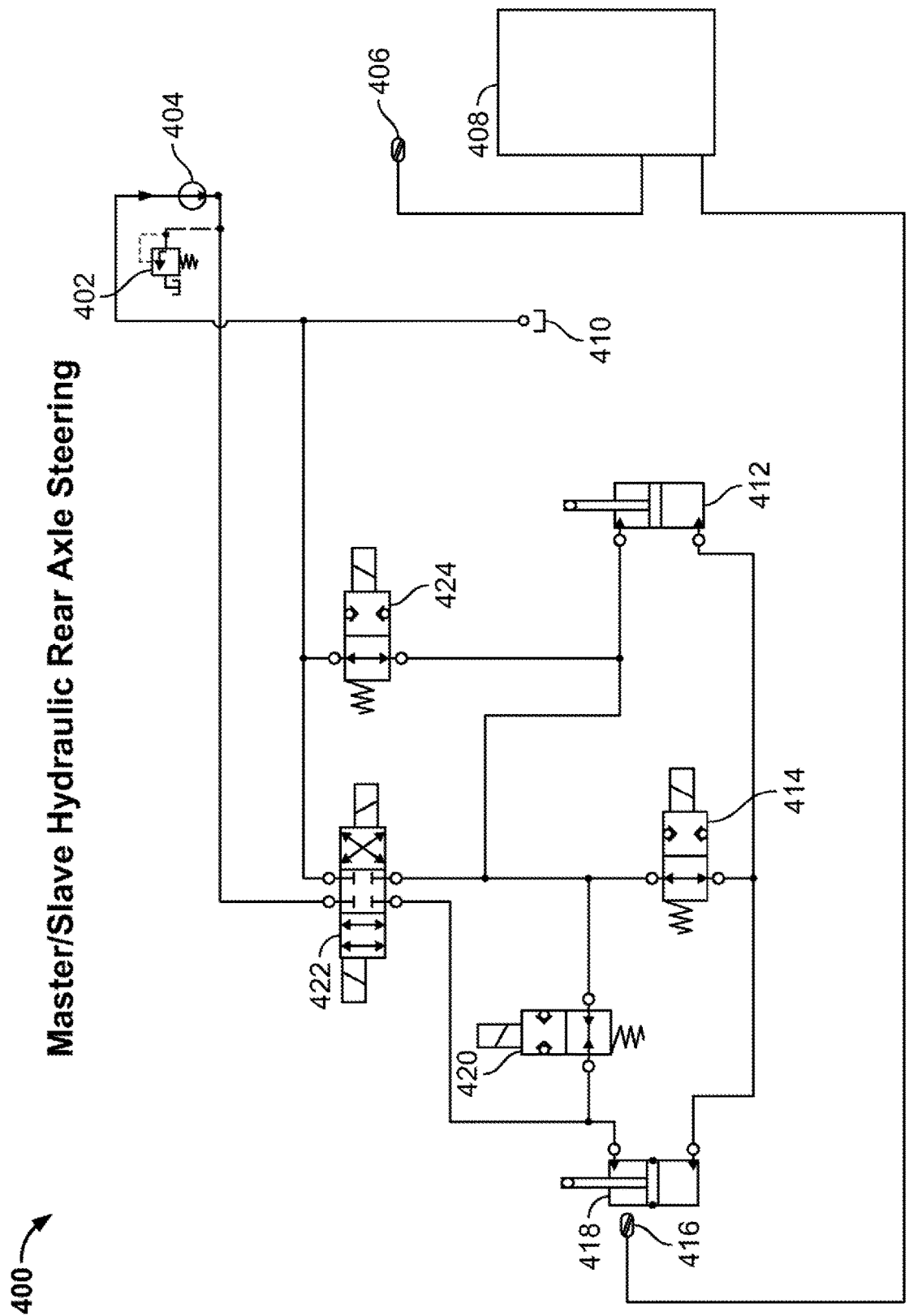
FIG. 19 is a static image of a hydraulic circuit of an exemplary steering control system of the present disclosure.

FIG. 19 is a static image of a hydraulic circuit 400 of the steering control system 300. The hydraulic circuit 400 includes a relief valve 402, a steering pump 404, a steering wheel or device position sensor 406, and a controller 408. The hydraulic circuit 400 includes a tank 410, return to tank blocking valves 414, 420, 424, and a steering proportional directional valve 422. The hydraulic circuit 400 includes steering cylinders 412, 418 and a cylinder position sensor 416 associated with only the steering cylinder 418.

Figure 20:
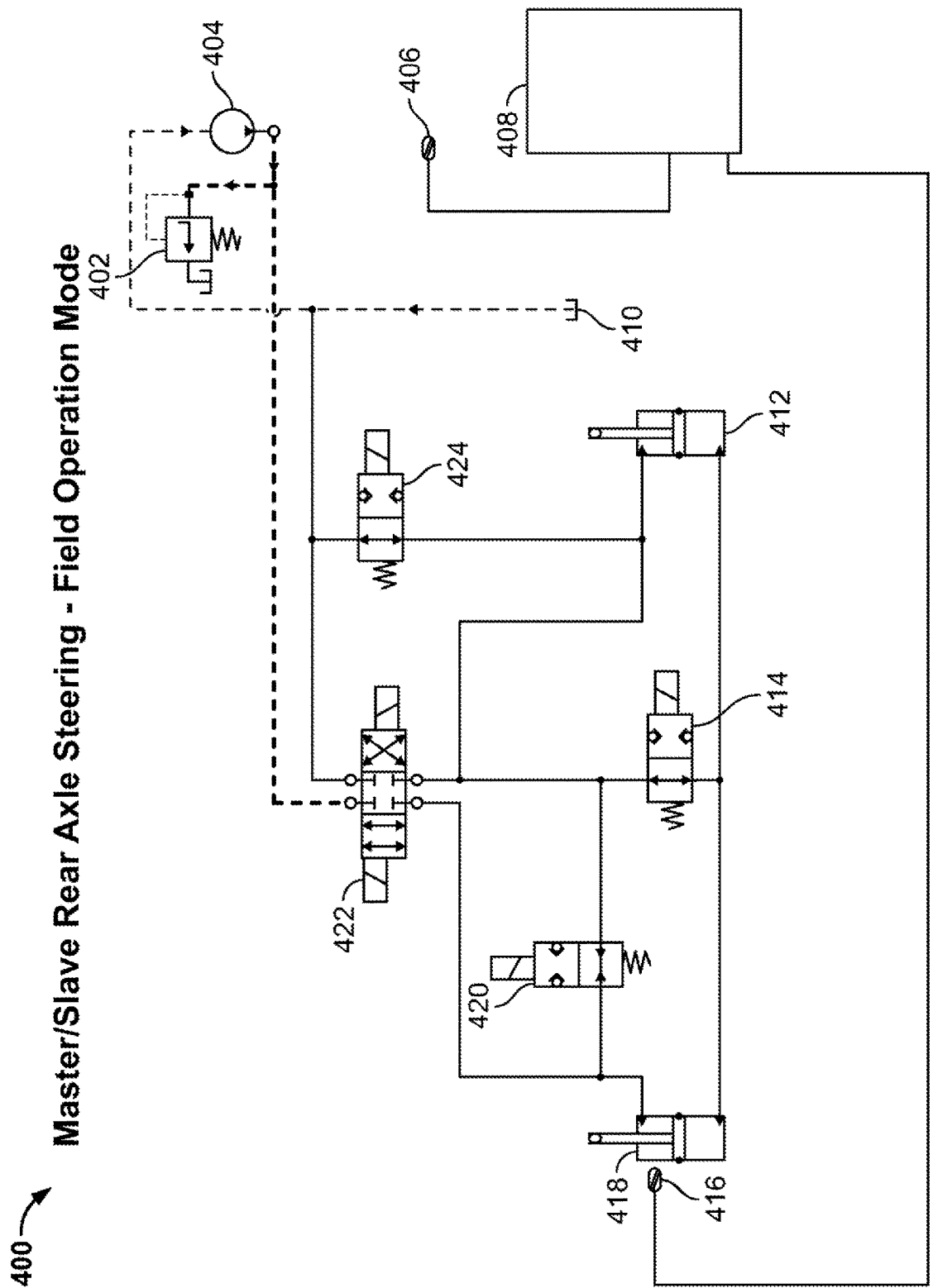
FIG. 20 is the hydraulic circuit of FIG. 19 in a field operation mode.

FIG. 20 is the hydraulic circuit 400 in an in-field operation mode. The blocking valves 414, 420, 424 are opened, allowing free flow of hydraulic fluid into and out of the steering cylinders 412, 418 and back to tank 410. Steering of the windrower 100 is controlled by the front drive wheel dual-path steering system only (e.g., without steering from the cylinders 412, 418).

Figure 21:
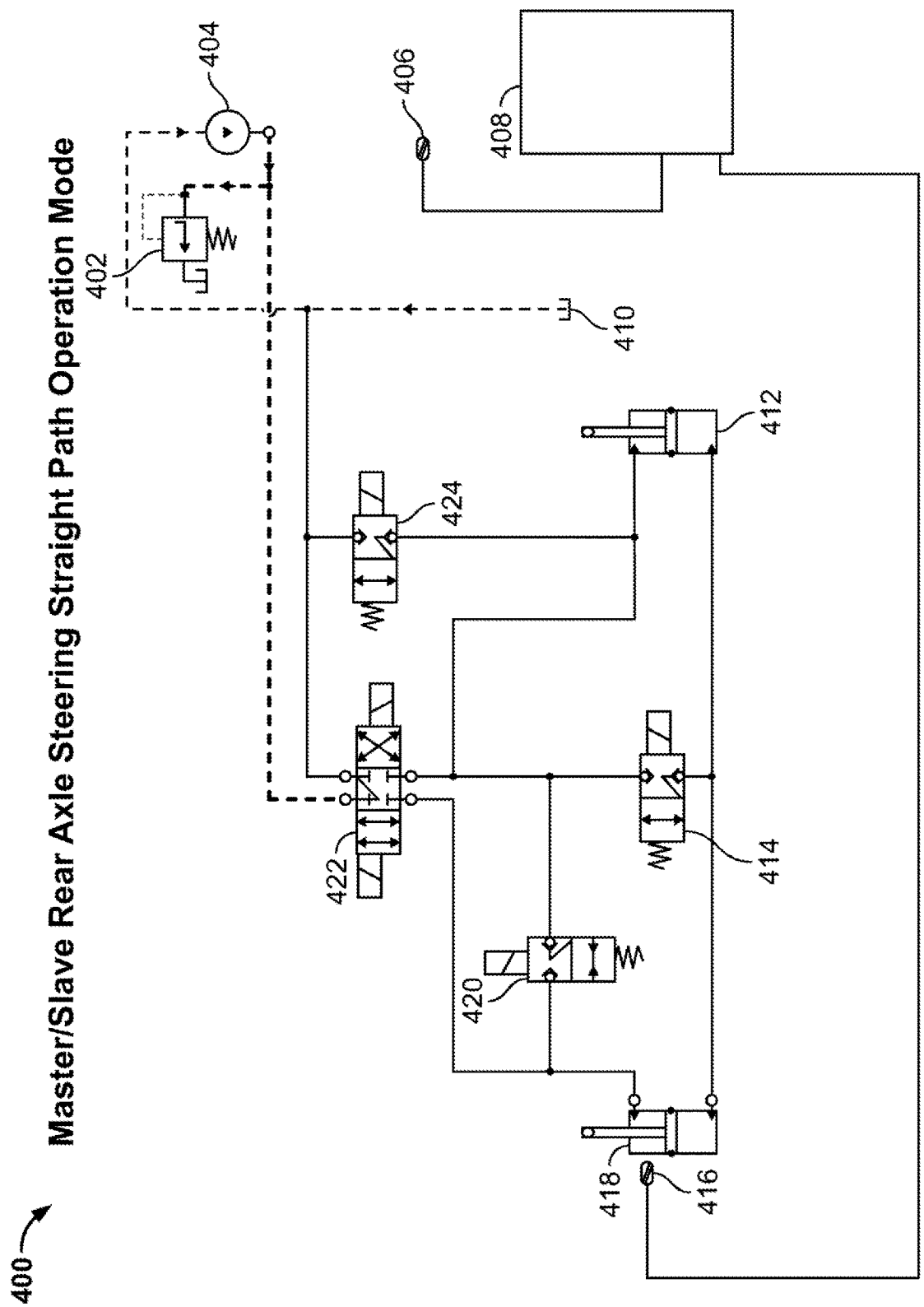
FIG. 21 is the hydraulic circuit of FIG. 19 in a straight path operation mode.

FIG. 21 is the hydraulic circuit 400 in a straight path operation mode. The steering proportional directional valve 422 is centered with the steering cylinders 412, 418 centered (e.g., partially extended). Steering of the windrower 100 is controlled by a combination of the front drive wheel dual-path steering and the rear axle steering from the cylinder 418. The desired steering position can be provided to the controller 408 by a steering wheel or device position sensor 406, while the actual rear wheel position feedback can be provided to the controller 408 by the steering cylinder position sensor 416 (e.g., on the left-hand side caster as shown in FIGS. 14-18).

Figure 22:
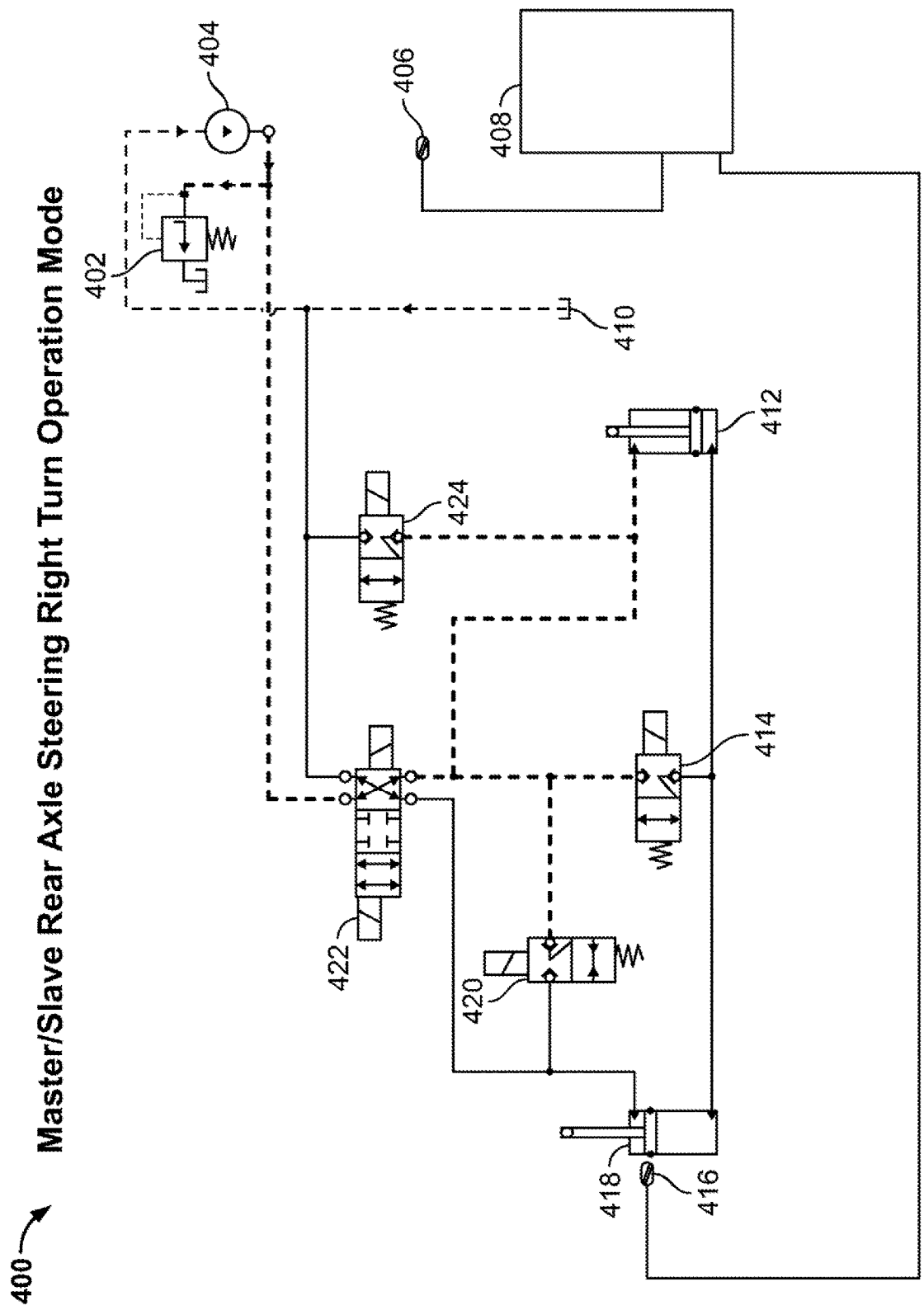
FIG. 22 is the hydraulic circuit of FIG. 19 in a right turn operation mode.

FIG. 22 is the hydraulic circuit 400 in a right turn operation mode. The steering proportional directional valve 422 is shifted to retract the steering cylinder 412 which, in turn, extends the steering cylinder 418, resulting in the windrower 100 turning right. Steering of the windrower 100 is controlled by a combination of the front drive wheel dual-path steering and the rear axle steering from the cylinder 418. The desired steering position can be provided to the controller 408 by a steering wheel or device position sensor 406, while the actual rear wheel position feedback can be provided to the controller 408 by the steering cylinder position sensor 416 (e.g., on the left-hand side caster as shown in FIGS. 14-18).

Figure 23:
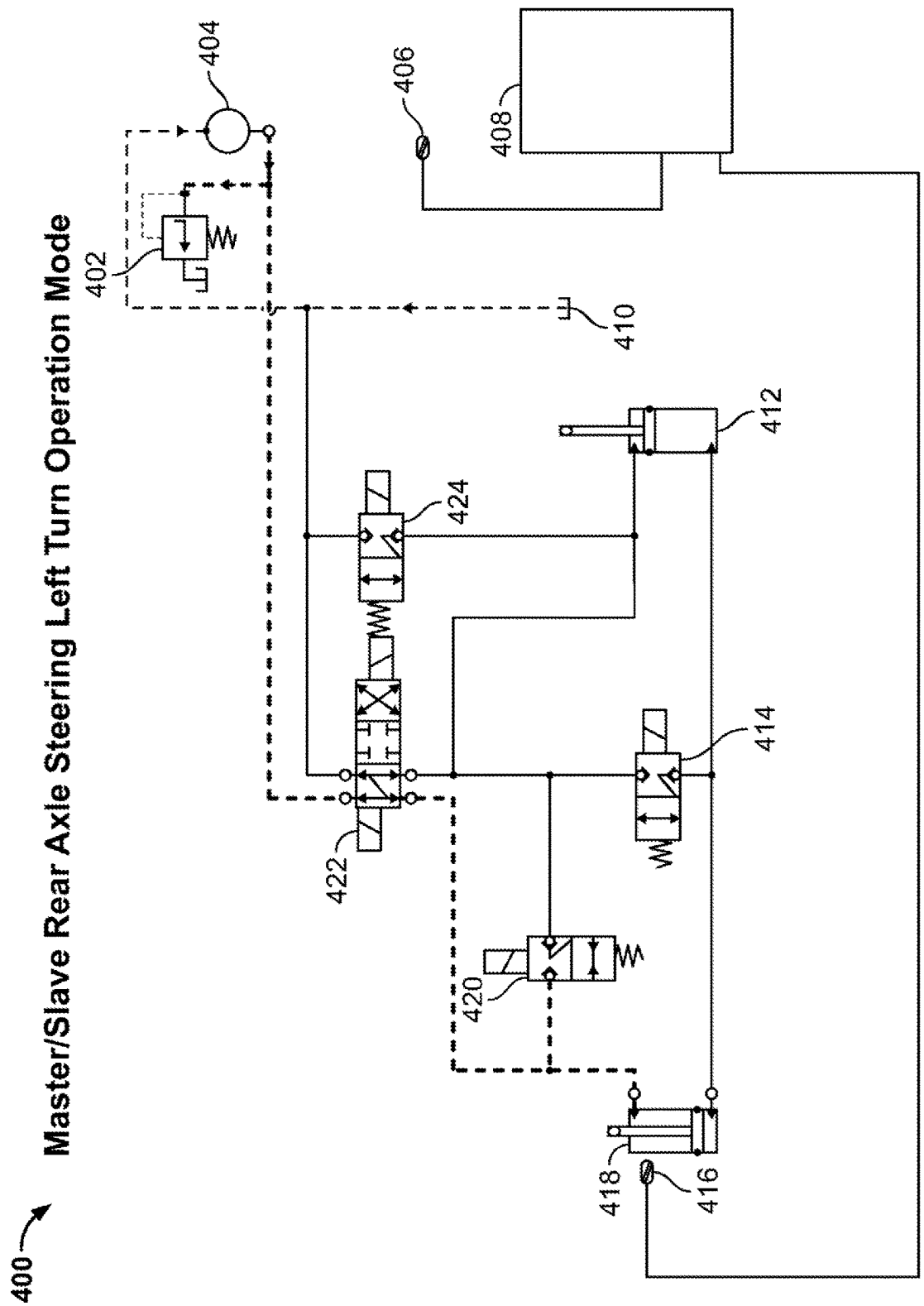
FIG. 23 is the hydraulic circuit of FIG. 19 in a left turn operation mode.

FIG. 23 is the hydraulic circuit 400 in a left turn operation mode. The steering proportional directional valve 422 is shifted to retract the steering cylinder 418 which, in turn, extends the steering cylinder 412, resulting in the windrower 100 turning left. Steering of the windrower 100 is controlled by a combination of the front drive wheel dual-path steering and the rear axle steering from the cylinder 418. The desired steering position can be provided to the controller 408 by a steering wheel or device position sensor 406, while the actual rear wheel position feedback can be provided to the controller 408 by the steering cylinder position sensor 416 (e.g., on the left-hand side caster as shown in FIGS. 14-18).

Figure 24:
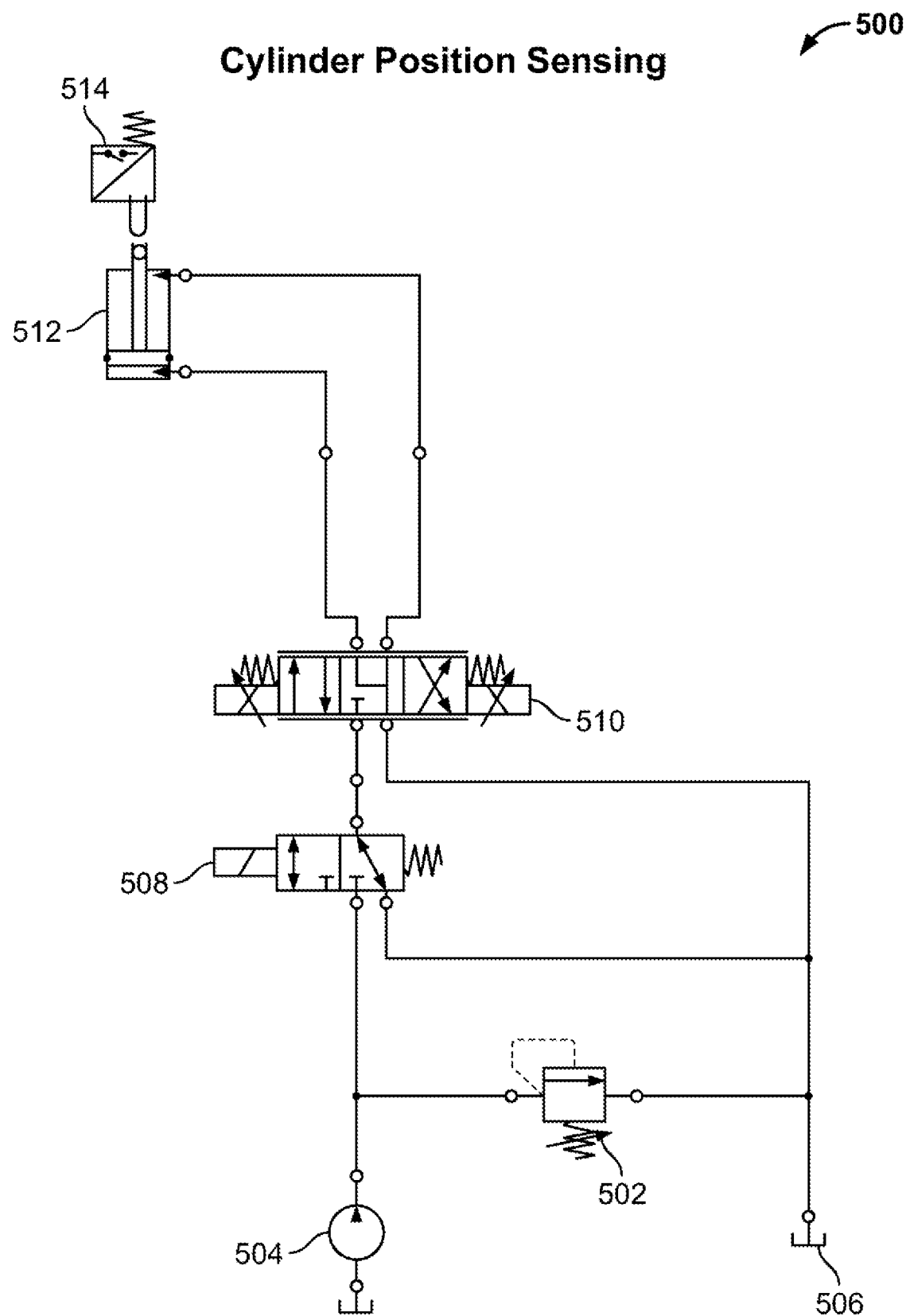
FIG. 24 is a static image of a hydraulic circuit of an exemplary steering control system of the present disclosure.

FIG. 24 is a static image of an alternate hydraulic circuit 500 of the steering control system 130. The hydraulic circuit 500 includes a relief valve 502, a steering pump 504, and a tank 506. The hydraulic circuit 500 includes a return to tank blocking valve 508, and a steering proportional directional valve 510. The hydraulic circuit 500 includes a steering cylinder 512 and a cylinder position sensor 514.

Figure 25:
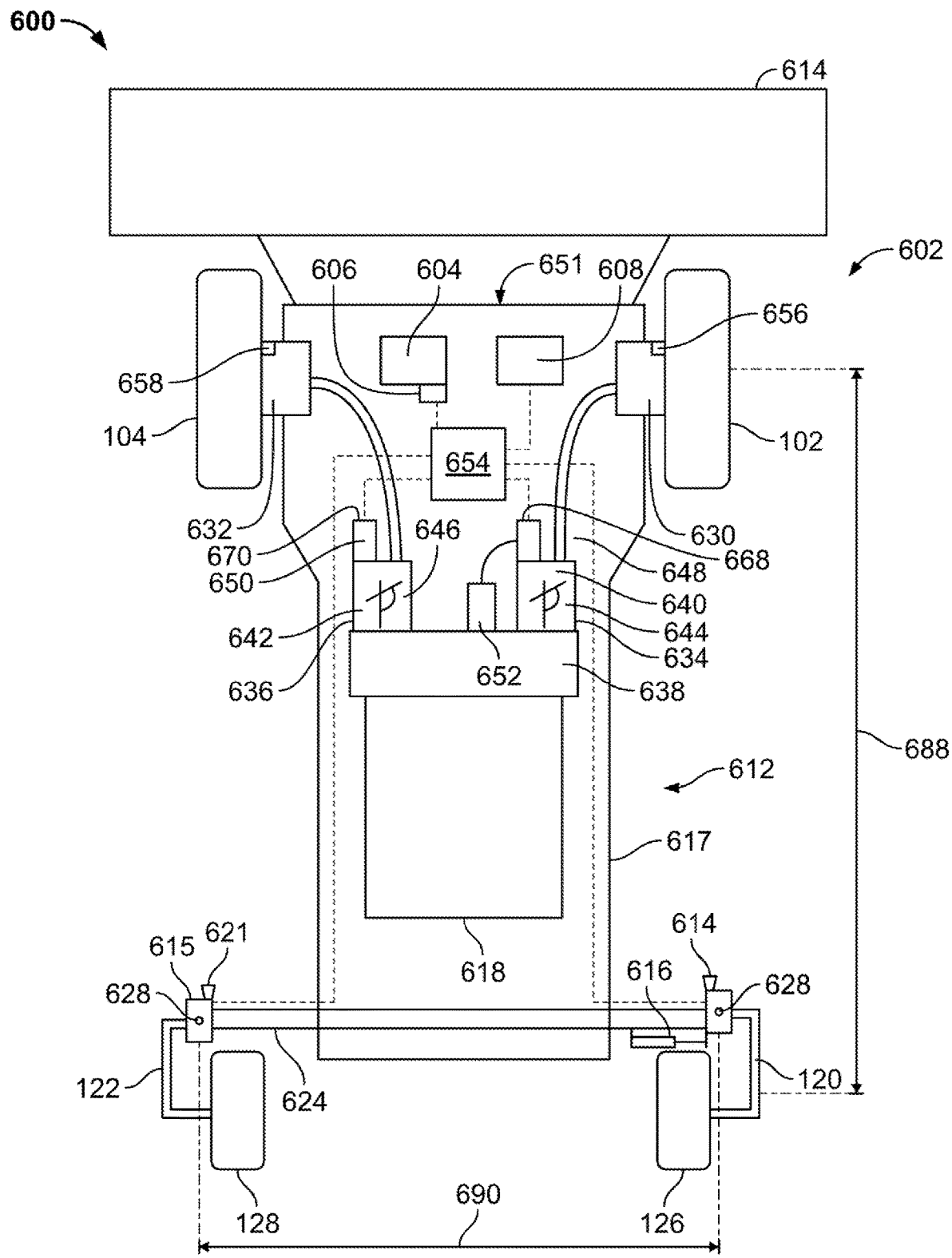
FIG. 25 shows a plan view of a vehicle having an example system for establishing a steering angle of a steerable caster according to the invention.

The aforementioned embodiments for active steering of the rear wheels may be combined with an example vehicle 600 adapted for front wheel dual-path steering, shown in FIG. 25. The details of the rear steering embodiments, discussed above, have been omitted from FIG. 25. FIG. 25 shows an example dual path and rear axle steered vehicle 600 according to the invention. Vehicle 600 in this example comprises a tractor 612 supporting a header 614 for cutting crops. It is understood that the invention encompasses other types of vehicles such as harvesters, windrowers, and combines. Vehicle 600 comprises a chassis 617 on which an engine 618 is mounted. Front wheels 102 and 104 are mounted on chassis 617. Rear axle 624, also mounted on chassis 617, comprises at least one caster, in this example two casters 120 and 122. The casters 120 and 122, are free wheeling and rotate about respective caster axes 628 to steer vehicle 600 as it turns. Wheels 102 (right wheel) and 104 (left wheel) are driven and have angularly fixed axles, dual path steering being effected by applying different torque to one wheel than the other thereby causing the wheel with the greater applied toque to rotate through a rotation angle greater than the wheel having less applied torque, the turn being in the direction of the wheel with the smaller rotation angle. In conjunction with the dual path steering, casters 120 and 122 rotate about caster axes 628, rear axle steering being effected by rotating at least one of the casters, caster 120 or 122, in a direction consistent with the turn. The vehicle 600 may be manually steered by rotating a steering wheel 604.

Figure 26:
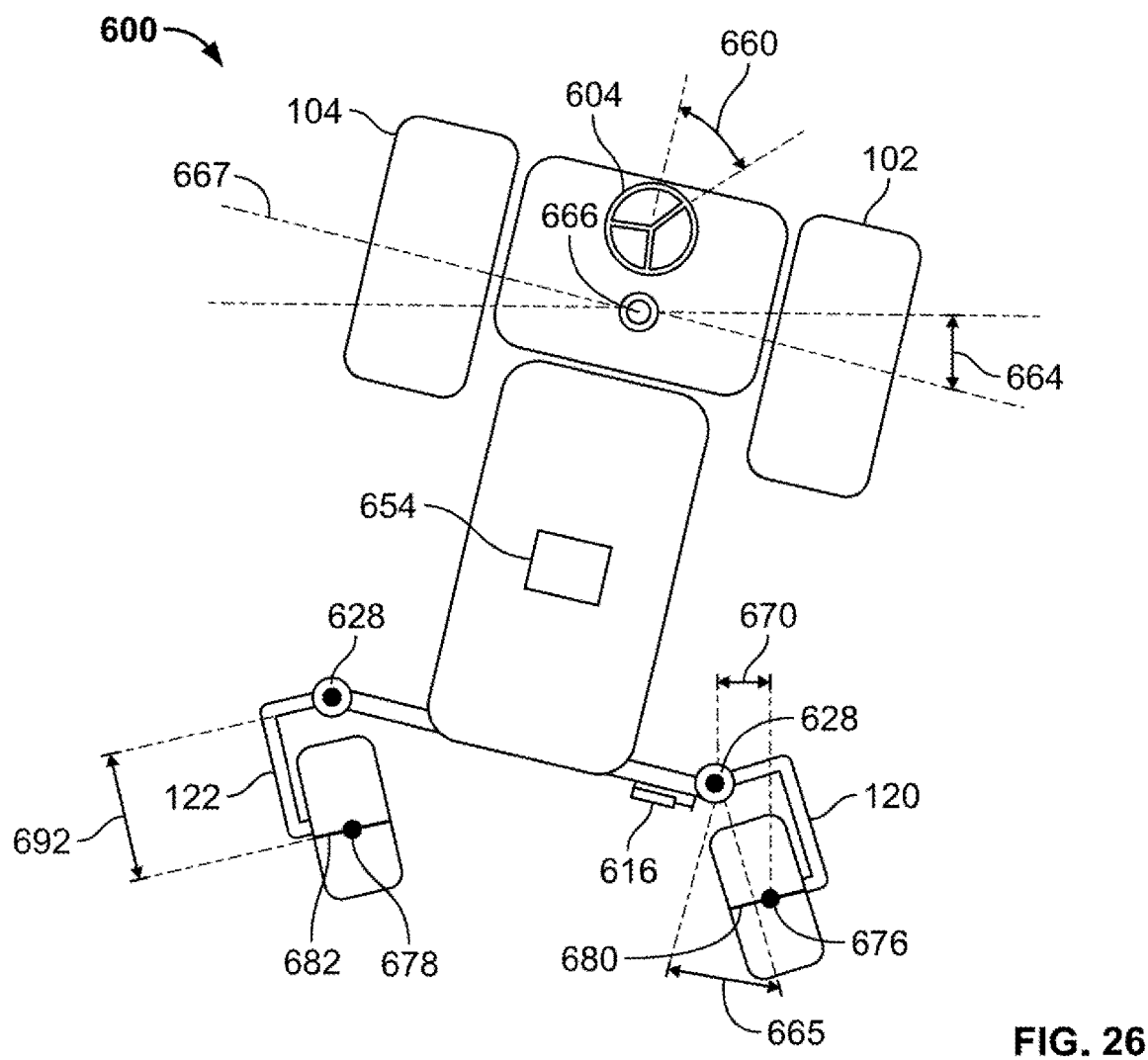
FIG. 26 shows an example vehicle while stationary being steered to the right based on an example method and system for establishing a steering angle of a steerable caster according to the invention.

In the example, shown in FIG. 26, the rear axle steering being executed by the at least one caster comprises caster 120. Caster 120 is rotated about the caster axis 628 by actuator 616. Actuator 616 may be a hydraulic cylinder similar to steering cylinder 144 of steering assembly 134, shown in FIG. 8 and described in detail above. Actuator 616 rotates caster 120 about the caster axis 628 in a direction consistent with the direction the steering wheel is rotated and proportion to magnitude of the angle through which the steering wheel 604 is rotated. To turn right, actuator 616 rotates caster 120 counter clockwise about caster axis 628. To turn left, actuator 616 rotates clockwise about caster axis 628. Caster 122 may be rotated by actuator 615 consistent with the rotation of caster 120. Actuator 615 may be a hydraulic cylinder similar to steering cylinder 304 of steering assembly 300 shown in FIGS. 14-16 and described in detail above.

As shown in FIG. 25, for dual path steering, torque is applied to the right wheel 102 by a right hydraulic motor 630 operatively associated with the right wheel, and torque is applied to the left wheel 104 by a left hydraulic motor 632 operatively associated with the left wheel. Both motors 630 and 632 are mounted on the chassis 617. The right hydraulic motor 630 is driven by a right hydraulic pump 634 operatively associated with the right hydraulic motor and the left hydraulic motor 632 is driven by a left hydraulic pump 636 operatively associated with the left hydraulic motor. Both hydraulic pumps 634 and 636 are driven by engine 618 through a gear box 638 and may comprise axial piston pumps as in this example.

As is well understood, the output (pressure, volume rate of flow, direction of flow) from an axial piston pump is controlled by adjusting the angle of the pump's swash plate with respect to the pump output. For example a swash plate oriented at a neutral angle, zero for example, the volume rate of flow will be zero. A positive swash plate angle results in a volume rate of flow in a positive direction and a negative swash plate angle results in a volume rate of flow in a negative direction. Vehicle 600 comprises a right swash plate 640 in the right hydraulic pump 634 and a left swash plate 642 in the left hydraulic pump 636. The right swash plate 640 is adjustable through a right swash plate angle 644 and the left swash plate 642 is adjustable through a left swash plate angle 646. In this example embodiment, the right swash plate angle 644 is adjusted by right swash plate actuator 648, and left swash plate angle 646 is adjusted by a left swash plate actuator 650. The right and left actuators 648 and 650 affecting the right and left swash plate angles 644 and 646, thus affecting the right and left motors 630 and 632, drive directions, either forward or in reverse. Right and left actuators 648 and 650 may be hydraulic actuators as in this example, driven by an actuator pump 652 by engine 618 through gear box 638.

For road and field operations, dual path and rear axle steering may be active. Dual path steering of wheels 102 and 104 may be accomplished by adjusting the right and left swash plate angles 644 and 646 of the right and left hydraulic pumps 634 and 636. When the right and left swash plate angles are zero, both pumps 634 and 636 do not drive, no torque will be applied to the right and left wheels via their respective motors 630 and 632 and the vehicle 600 will not move. The torque applied to the right and left wheels 102 and 104 of vehicle 600 is proportional to the swashplate angle, the greater swashplate angle produces larger torques. In conjunction with the dual path steering rear axle steering of at least one caster, caster 120 in this example, is accomplished by rotating caster 120 about caster axis 628.

For road operation, to turn left, the right and left swash plate angles 644 and 646 are adjusted with respect to one another so that the right swash plate angle 644 is greater than the left swash plate angle 646. Hydraulic oil flows in a direction in the right hydraulic pump 634 so as to apply more torque the right motor 630 than the left motor 632 in a direction moving wheel 102 forward relative to the vehicle. Simultaneously actuator 616 rotates caster 120 clockwise, and consequently vehicle 600 turns to the left. To turn right, the right and left swash plate angles 644 and 646 are adjusted with respect to one another so that the left swash plate angle 646 is greater than the right swash plate angle 644. Hydraulic oil flows in a direction in the left hydraulic pump 636 so as to apply more torque the left motor 632 than the right motor 630 in a direction moving wheel 104 forward relative to the vehicle. Simultaneously actuator 616 rotates caster 120 counter clockwise, and consequently vehicle 600 turns to the right.

For vehicle 600, while stationary and executing a direction orientation maneuver prior to transiting to a turn from one road to another, from one field to another, or from a road to a field, both dual path and rear axle steering may also be active. Dual path steering of, wheels 102 and 104 may be accomplished by adjusting the right and left swash plate angles 644 and 646 to be oriented opposite relative to one another. In conjunction with the dual path steering, rear axle steering may be accomplished by rotating caster 120 about caster axis 628. To turn right, the right and left swash plate angles 644 and 646 are adjusted with respect to one another so that the right swash plate angle 644 is oriented opposite to the left swash plate angle 646, the right swash plate angle 644 being positive and the left awash plate angle 646 being negative. Hydraulic oil flows in a direction in the right hydraulic pump 634 so as to torque the right motor 630 in a direction rotating wheel 102 so as to propel the vehicle in reverse, and hydraulic oil flows in a direction in the left hydraulic pump 636 so as to torque the left motor 632 in a direction rotating wheel 104 so as to propel the vehicle forward. Simultaneously actuator 616 rotates caster 120 counter clockwise, and consequently vehicle 600 turns to the right. To turn left, the right and left swash plate angles 644 and 646 are adjusted with respect to one another so that the right swash plate angle 644 is oriented opposite to the left swash plate angle 646, the right swash plate angle 644 being negative and the left swash plate angle 646 being positive. Hydraulic oil flows in a direction in the right hydraulic pump 634, so as to torque the right motor 630 in a direction rotating wheel 102 so as to propel the vehicle forward, and hydraulic oil flows in a direction in the left hydraulic pump 636, so as to torque the left motor 632 in a direction rotating wheel 104 so as to propel the vehicle in reverse. Simultaneously actuator 616 rotates caster 120 clockwise, and consequently the vehicle 600 turns left.

Vehicle 600 further comprises a control system 651. Control system 651 permits dual path and rear axle steering of vehicle 600, according to a method which, as shown in FIG. 26, establishes a steering angle of the steerable caster, while the vehicle is stationary and executing a direction orientation maneuver prior to transiting to a turn. The method, examples of which are described below, is advantageously invoked while at a junction of two roads, to execute a stationary turn of vehicle 600 in order to prepare for a turn from one road to the other. Dual path steered vehicles are capable of rotating the front wheels in opposite directions relative to one another while the rear casters passively follow. While this capability provides for zero radius turns, it can result in either of the front wheels spinning while trying to fight the castered rear wheels, or skidding the castered rear wheels sideways across the ground. To avoid such situations, and to reduce the stresses on the rear axle steering components, it is advantageous to employ an example control system and steering method according to the invention.

As shown in FIG. 25, control system 651 comprises a controller 654, for example, a programmable logic controller, or other microprocessor based computer mounted on chassis 617. Resident software on the controller provides algorithms to execute a method of establishing a steering angle of the steerable caster while the vehicle is stationary according to the invention. The controller 654 may be in communication with a steering wheel sensor 606, which detects the magnitude and direction of a turn of the steering wheel 604. Steering wheel sensor 606 generates signals indicative of the direction and magnitude of the steering wheel 604 rotation, and transmits these signals to controller 654. Communication between the controller 654 and the steering wheel sensor 606 may be via wires or wirelessly via radio frequency transmitters. Controller 654 is adapted to receive signals from the steering wheel sensor 606 and invoke the method of establishing a steering angle of the steerable caster while the vehicle is stationary according to the invention.

Control system 651 may further comprise right and left wheel rotational sensors 656 and 658. The wheel rotational sensors, in signal communication with the controller 654, are operatively associated with respective wheels 102 and 104 and measure the respective rotational angles and torques of each wheel. Rotational sensors 656 and 658 also generate signals indicative of the rotational angles and torque of wheels 102 and 104 and transmit the signals to controller 654. Transmission of the signals may be via wire or wirelessly via radio frequency transmitters.

As further shown in FIG. 25, control system 651 also comprises a right wheel actuator 668 and a left wheel actuator 670. Actuators 668 and 670 are in communication with controller 654, which is adapted to transmit command signals to the actuators to change the right and left wheel rotational angles 672 and 674 (see FIG. 26A), and adjust (increase or decrease) the torque applied to the right and left wheels 102 and 104. In this example embodiment, the left wheel actuator 670 comprises the left swashplate actuator 650 and the right wheel actuator 668 comprises the right swashplate actuator 648. The swashplate actuators 648 and 650 respectively control the swashplate angles 644 and 646 and thus control the respective rotational angles 672 and 674 and torque applied to the right and left wheels 102 and 104. The controller 654 is adapted to adjust the left and right swashplate angles 646 and 644 via the actuators and thereby adjust left and right rotational angles 672 and 674, for example, to turn the vehicle 600 while the vehicle is stationary.

Also shown in FIG. 25, control system 651 comprises left and right caster actuators 615 and 616. The caster actuators, in communication with the controller 654, may rotate at least one caster, in this example caster 120, about caster axis 628. Caster actuator 615 may be configured to rotate caster 122 consistent with the rotation of caster 120. The communication between the controller 654 and the caster actuators 615 and 616 may be via wires or wirelessly via radio frequency signals.

Figure 27:
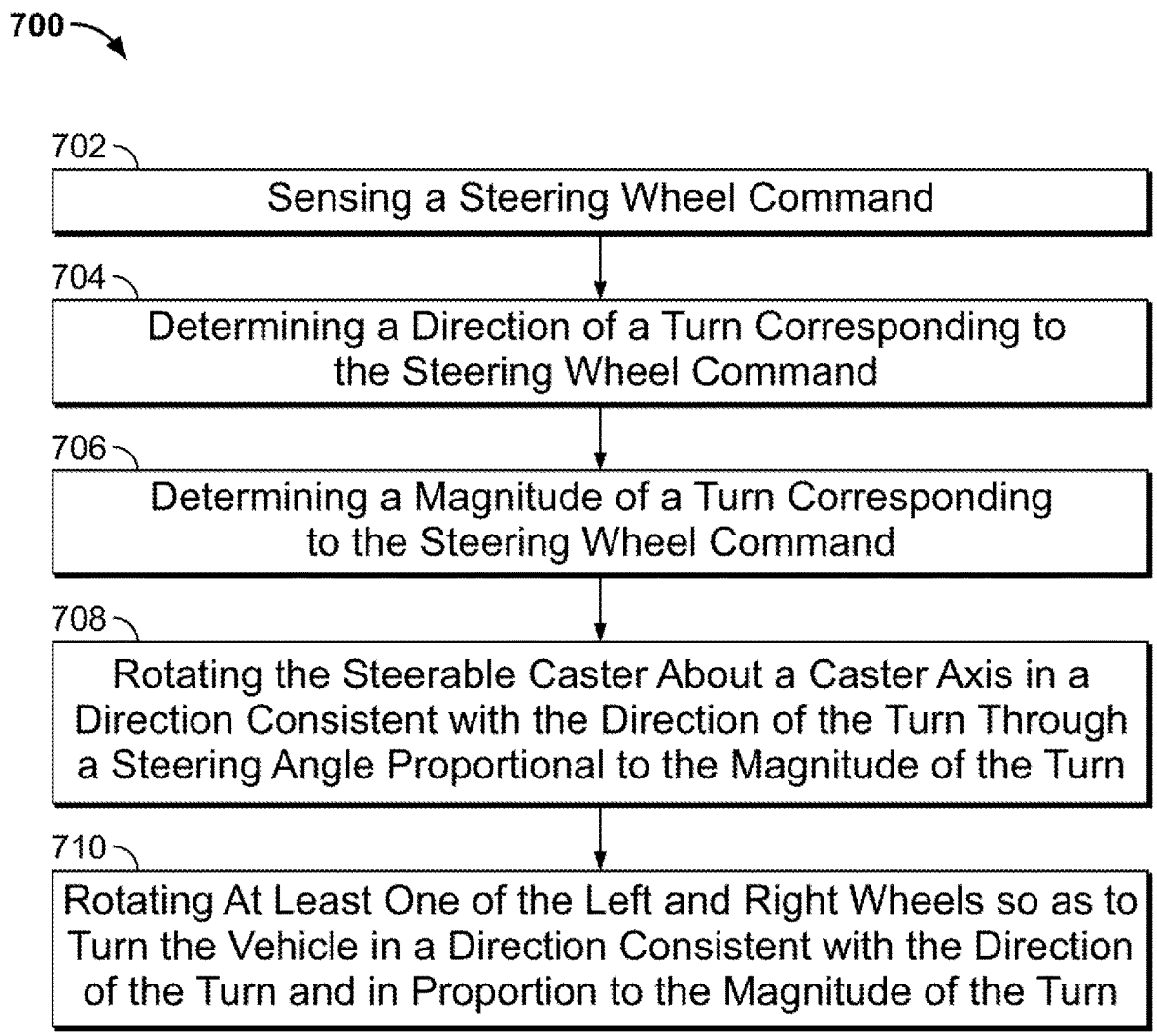
FIG. 27 is a flow chart of an example method for establishing an angle of a steerable caster according to the invention.

FIGS. 26 and 27 illustrate an example steering control system and method, which establishes a steering angle of the steerable caster 120 while the vehicle 600 is stationary and executing a direction orientation maneuver prior to transiting to a turn. As shown in the flow chart of FIG. 27, the example method 700 may include sensing a steering command (702) initiated by a vehicle operator rotating the steering wheel 604. This step is conveniently executed using the steering wheel sensor 606, which senses a direction which the steering wheel is rotated, and an angle 660 through which the steering wheel 604 is rotated, as shown in FIG. 26. The controller 654 next determines a direction (704) and a magnitude (706) of a turn corresponding to the steering command. The direction of the turn in step 704 is determined by the direction which the steering wheel 604 is rotated. The magnitude of the turn in step 706 is determined by the size of the angle 660 (FIG. 26) through which the steering wheel 604 is rotated.

In response to the steering command, the controller 654 next rotates the steerable caster 120 (708) and rotates at least one of the left and right wheels 104 and 102 (710), as shown in FIG. 27. Step 708 may be executed using the caster actuator 616, which receives a command from controller 654 to rotate the steerable caster 120 about a caster axis 628 in a direction consistent with the direction of the turn through a steering angle 665 proportional to the magnitude of the turn, as shown in FIG. 26. Step 710 may be executed by at least one of the left and right wheel actuators 670 and 668 (see FIG. 25), which receive a command from controller 654 to rotate at least one of left and right wheels 104 and 102 to turn the vehicle in a direction consistent with the direction of the turn and in proportion to the magnitude of the turn.

As shown in FIGS. 26 and 28, the method further comprises step 712, where the controller 654 commands at least one of the left and right motor actuators 670 and 668, to rotate a least one of the left and right wheels, 104 and 102, through an angle, 672 or 674 (see FIG. 26A), such that the only motion of the left and right casters 122 and 120 is rotation about respective left and right vertical axes 678 and 676 passing through respective ground contact patches 680 and 682 of the left and right casters 122 and 120. It is understood that algorithms contained within the controller 654 govern the relationships between the steering command, the rotation of at least one steerable caster, and the rotation of the at least one of the left and right wheels. These relationships will be different for different vehicles and tractors and may be established based upon one or more parameters, illustrated in FIGS. 25, 26 and 26A, such as: a size of the front wheels 684; a span of the front wheels 686 (FIG. 26A); a wheel base 688; a distance 690 between the respective caster axes 628 along the axle 624 (FIG. 25); a distance 692 between the respective caster axes 628 and the respective rear wheel ground patches 682 and 680 (FIG. 26); and combinations of these parameters.

The method 700 may further comprise rotating both left and right wheels 104 and 102 in opposite directions from one another consistent with the direction of the turn and in proportion to the magnitude of the turn (714), as shown in FIG. 29. This step is executed by the left and right motor actuators 670 and 668 which receive commands from controller 654 to rotate both left and right wheels 104 and 102 in opposite directions. The method further comprises, the controller 654 commanding both left and right wheels 104 and 102 to rotate through respective angles 672 and 674 (see FIG. 26A), such that the only motion of the left and right casters 122 and 120 is rotation about respective left and right vertical axes 678 and 676 passing through respective ground contact patches 682 and 680 of the left and right casters 122 and 120 (716) (see FIG. 26). As an example, shown in FIGS. 26 and 26A, rotation of both the left and right wheels 104 and 102 may be in equal and opposite directions from one another, resulting in the respective right and left wheel rotational angles 672 and 674, thereby rotating the vehicle 600 in an angle 664 about point 666 midway between the centerline 667 of the front wheels 102 and 104.

As shown in FIG. 30, the method may further comprise: initially applying equal torque to the left and right wheels 104 and 102 (718), as the vehicle while stationary executes a direction orientation maneuver prior to transitioning to a turn; and applying increased torque to the wheel on an outside of the turn (720) as the vehicle turns. At the completion of step 718, step 720 is implemented to smooth the transition from the direction orientation maneuver to the turn. Step 720 is executed by the motor actuator, 670 or 668, located on the outside of the turn, which receives a command from controller 654 to increase torque to the outside wheel, 104 or 102.

Figure 31:
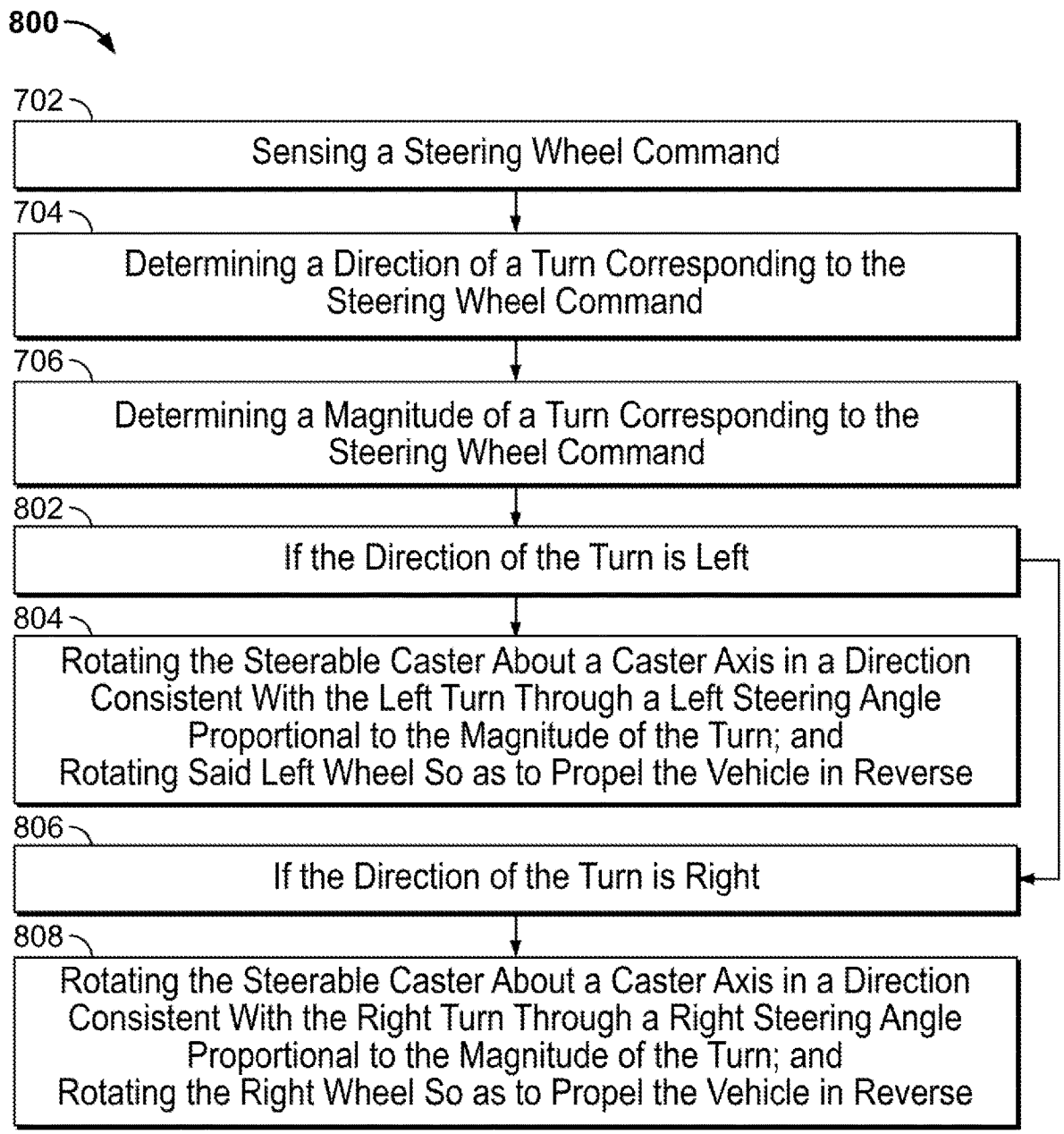
FIG. 31 is a flow chart of an example method for establishing an angle of a steerable caster when turning right and left according to the invention.

An example steering control method 800, which establishes a steering angle of the steerable caster 120 while the vehicle 600 is stationary and turning to the left or right is shown in the flow chart of FIG. 31. Like method 700, method 800 comprises steps of sensing a steering wheel direction (702), determining a direction (704) and magnitude (706) of a turn. Method 800 further comprises the step when the turn is left (802), the steerable caster 120 is rotated about a caster axis 628 in a direction consistent with the left turn through a left steering angle proportional to the magnitude of the turn, and the left wheel 104 is rotated so as to propel the vehicle in reverse (804). Step 804 is implemented by the controller 654 transmitting signals a) commanding the caster actuator 616 to rotate caster 120, and b) commanding the left wheel actuator 670 to rotate the left wheel 104. Method 800 further comprises the step when the turn is right (806), the steerable caster 120 is rotated about a caster axis 628 in a direction consistent with the right turn through a right steering angle proportional to the magnitude of the turn, and the right wheel 102 is rotated so as to propel the vehicle in reverse (808). Step 808 is implemented by the controller 654 transmitting signals a) commanding the caster actuator 616 to rotate caster 120, and b) commanding the right wheel actuator 668 to rotate the right wheel 102.

Figure 26A:
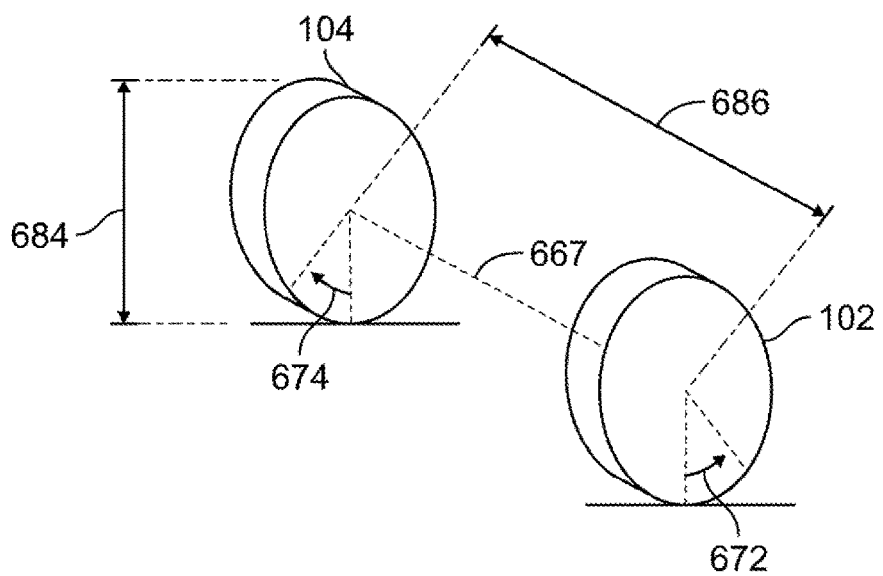
FIG. 26A shows an isolated isometric view of the left and right wheel rotational angles of an example vehicle.

As shown in FIG. 32, method 800 further comprises step 810, where the left and right wheels 104 and 102 are rotated through respective rotational angles 672 and 674, such that the only motion of the left and right casters 122 and 120 is rotation about respective left and right vertical axes 678 and 676 passing through respective ground contact patches 682 and 680 of the left and right casters 122 and 120 (see FIGS. 26 and 26A).

As shown in FIG. 33, method 800 may further comprise the step where the turn is to the left, then the right wheel 102 is also rotated so as to propel the vehicle forward (814). The method further comprises step 716, as described above.

As shown in FIG. 34, method 800 may further comprise the step where the turn is to the right, then the left wheel 104 is also rotated so as to propel the vehicle forward (816). The method further comprises step 716, as described above.

Figure 35:
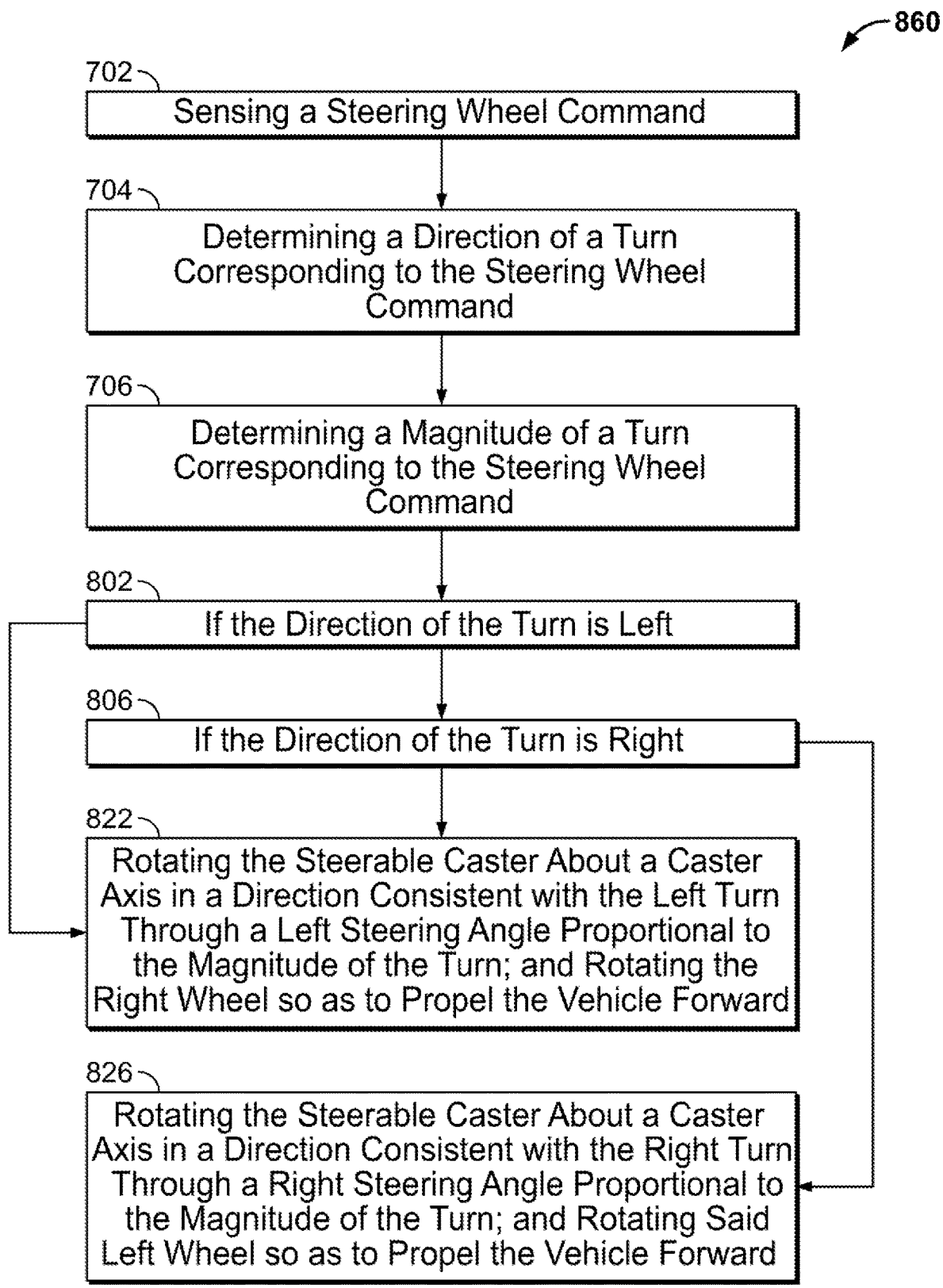
FIG. 35 is a flow chart of an example method for establishing an angle of a steerable caster when turning right and left according to the invention.

Another example steering control method 860, which establishes a steering angle of the steerable caster 120 while the vehicle 600 is stationary and turning to the left or right, is shown in the flow chart of FIG. 35. Like methods 700, and 800, method 860 comprises steps of sensing a steering wheel direction (702), determining a direction (704) and magnitude (706) of a turn. Method 860 further comprises the step when the turn is left (802), the steerable caster 120 is rotated about a caster axis 628 in a direction consistent with the left turn through a left steering angle proportional to the magnitude of the turn, and the right wheel 102 is rotated so as to propel the vehicle forward (822). Step 822 is implemented by the controller 654 transmitting signals a) commanding the caster actuator 616 to rotate caster 120, and b) commanding the right wheel actuator 668 to rotate the right wheel 102. Method 860 further comprises the step when the turn is right (806), the steerable caster 120 is rotated about a caster axis 628 in a direction consistent with the right turn through a right steering angle proportional to the magnitude of the turn, and the left wheel 104 is rotated so as to propel the vehicle forward (826). Step 826 is implemented by the controller 654 transmitting signals a) commanding the caster actuator 616 to rotate caster 120, and b) commanding the left wheel actuator 670 to rotate the left wheel 104.

Method 860 further comprises step 810, as shown in FIG. 32 and described above.

As shown in FIG. 36, method 860 may further comprise the step where the turn is to the left, the left wheel 104 is also rotated so as to propel the vehicle in reverse (828). The method further comprises step 716, as described above.

As shown in FIG. 37, method 860 may further comprise the step where the turn is to the right, the right wheel 102 is also rotated so as to propel the vehicle in reverse (830). The method further comprises step 716, as described above.

It is expected that vehicles, such as windrowers including tractors and forage harvesters with dual path and rear axle steering will be able to better avoid rear axle steering component damage while stationary and executing a direction orientation maneuver in preparation for a turn from one road to another when methods and systems according to the invention are implemented.

While exemplary embodiments have been described herein, it is expressly noted that these embodiments should not be construed as limiting, but rather that additions and modifications to what is expressly described herein also are included within the scope of the present disclosure. Moreover, it is to be understood that the features of the various embodiments described herein are not mutually exclusive and can exist in various combinations and permutations, even if such combinations or permutations are not made express herein, without departing from the spirit and scope of the present disclosure.

The invention claimed is:

1. For a vehicle capable of both dual path and rear axle steering, said vehicle having respective left and right powered front mounted wheels and a rear axle having respective left and right casters, at least one of said casters being a steerable caster, a method for establishing a steering angle of said steerable caster while said vehicle is stationary, said method comprising:
sensing a steering command;
determining a direction of a turn corresponding to said steering command;
determining a magnitude of said turn corresponding to said steering command;
rotating said steerable caster about a caster axis in a direction consistent with said direction of said turn through a steering angle proportional to said magnitude of said turn; and
rotating at least one of said left and right wheels so as to turn said vehicle in a direction consistent with said direction of said turn and in proportional to said magnitude of said turn.

2. The method according to claim 1, wherein said direction of said turn is determined by a direction which a steering wheel is rotated.

3. The method according to claim 1, wherein said magnitude of said turn is determined by the size of an angle through which a steering wheel is rotated.

4. The method according to claim 1, wherein said at least one of said left and right wheels is rotated through an angle such that the only motion of said left and right casters is rotation about respective left and right vertical axes passing through respective ground contact patches of said left and right casters.

5. The method according to claim 1, further comprising rotating both said left and said right wheels in opposite directions from one another consistent with said direction of said turn and in proportion to said magnitude of said turn.

6. The method according to claim 5, wherein said left and right wheels are rotated through respective angles such that the only motion of said left and right casters is rotation about respective left and right vertical axes passing through respective ground contact patches of said left and right casters.

7. The method according to claim 5, further comprising:
initially applying equal torque to said left and right wheels to move said vehicle into said turn; and
applying increased torque to said wheel on an outside of said turn.

8. For a vehicle capable of both dual path and rear axle steering, said vehicle having respective left and right powered front mounted wheels and a rear axle having respective left and right casters, at least one of said casters being a steerable caster, a method for establishing a steering angle of said steerable caster while said vehicle is stationary, said method comprising:
sensing a steering command;
determining a direction of a turn corresponding to said steering command;
determining a magnitude of said turn corresponding to said steering command; wherein
if said direction of said turn is left, then:
rotating said steerable caster about a caster axis in a direction consistent with said left turn through a left steering angle proportional to said magnitude of said turn; and
rotating said left wheel so as to propel said vehicle in reverse; and wherein
if said direction of said turn is right, then:
rotating said steerable caster about a caster axis in a direction consistent with said right turn through a right steering angle proportional to said magnitude of said turn; and
rotating said right wheel so as to propel said vehicle in reverse.

9. The method according to claim 8, wherein:
said left wheel is rotated through an angle such that the only motion of said left and right casters is rotation about respective left and right vertical axes passing through respective ground contact patches of said left and right casters; and
said right wheel is rotated through an angle such that the only motion of said left and right casters is rotation about respective left and right vertical axes passing through respective ground contact patches of said left and right casters.

10. The method according to claim 8, wherein if said direction of said turn is left, then also rotating said right wheel so as to propel said vehicle forward.

11. The method according to claim 10, wherein said left and right wheels are rotated through respective angles such that the only motion of said left and right casters is rotation about respective left and right vertical axes passing through respective ground contact patches of said left and right casters.

12. The method according to claim 8, wherein if said direction of said turn is right, then also rotating said left wheel so as to propel said vehicle forward.

13. The method according to claim 12, wherein said left and right wheels are rotated through respective angles such that the only motion of said left and right casters is rotation about respective left and right vertical axes passing through respective ground contact patches of said left and right casters.

14. The method according to claim 12, further comprising:

initially applying equal torque to said left and right wheels to move said vehicle into said turn; and applying increased torque to said wheel on an outside of said turn.

15. For a vehicle capable of both dual path and rear axle steering, said vehicle having respective left and right powered front mounted wheels and a rear axle having respective left and right casters, at least one of said casters being a steerable caster, a method for establishing a steering angle of said steerable caster while said vehicle is stationary, said method comprising:

sensing a steering command;

determining a direction of a turn corresponding to said steering command;

determining a magnitude of said turn corresponding to said steering command; wherein if said direction of said turn is left, then:

rotating said steerable caster about a caster axis in a direction consistent with said left turn through a left steering angle proportional to said magnitude of said turn; and rotating said right wheel so as to propel said vehicle forward; and wherein if said direction of said turn is right, then:

rotating said steerable caster about a caster axis in a direction consistent with said right turn through a right steering angle proportional to said magnitude of said turn; and rotating said left wheel so as to propel said vehicle forward.

16. The method according to claim 15, wherein:

said left wheel is rotated through an angle such that the only motion of said left and right casters is rotation about respective left and right vertical axes passing through respective ground contact patches of said left and right casters; and said right wheel is rotated through an angle such that the only motion of said left and right casters is rotation about respective left and right vertical axes passing through respective ground contact patches of said left and right casters.

17. The method according to claim 15, wherein if said direction of said turn is left, then also rotating said left wheel so as to propel said vehicle in reverse.

18. The method according to claim 17, wherein said left and right wheels are rotated through respective angles such that the only motion of said left and right casters is rotation about respective left and right vertical axes passing through respective ground contact patches of said left and right casters.

19. The method according to claim 15, wherein if said direction of said turn is right, then also rotating said right wheel so as to propel said vehicle in reverse.

20. The method according to claim 19, wherein said left and right wheels are rotated through respective angles such that the only motion of said left and right casters is rotation about respective left and right vertical axes passing through respective ground contact patches of said left and right casters.

21. The method according to claim 19, further comprising:

initially applying equal torque to said left and right wheels to move said vehicle into said turn; and applying increased torque to said wheel on an outside of said turn.

22. For a vehicle capable of both dual path and rear axle steering, said vehicle having respective left and right powered front mounted wheels and a rear axle having respective left and right casters, at least one of said casters being a steerable caster, a control system for establishing a steering angle of said steerable caster while said vehicle is stationary, said control system comprising:

a controller;

a steering wheel sensor in communication with said controller, said steering wheel sensor measuring a magnitude and direction of a turn of a steering wheel and sending signals indicative of said magnitude and direction of said turn to said controller;

a left wheel actuator in communication with said controller for adjusting said rotational angle of said left wheel;

a right wheel actuator in communication with said controller for adjusting said rotational angle of said right wheel;

a caster actuator in communication with said controller for adjusting the rotation of a steerable caster wherein said controller is adapted to:

receive said signals indicative of said magnitude and direction of said turn;

rotate said steerable caster about a caster axis in a direction consistent with said direction of said turn through a steering angle proportional to said magnitude of said turn; and rotate at least one of said left and right wheels so as to turn said vehicle in a direction consistent with said direction of said turn and in proportional to said magnitude of said turn pursuant to a control method executed by said controller.

* * * * *